United States Patent
Holmskär (12)

(10) Patent No.: US 6,438,551 B1
(45) Date of Patent: Aug. 20, 2002

(54) LOAD CONTROL AND OVERLOAD PROTECTION FOR A REAL-TIME COMMUNICATION SYSTEM

(75) Inventor: Stig Holmskär, Karlstad (SE)

(73) Assignee: Telefonaktiebolaget L M Ericsson (publ), Stockhom (SE)

(*) Notice: Subject to any disclaimer, the term of this patent is extended or adjusted under 35 U.S.C. 154(b) by 0 days.

(21) Appl. No.: 09/208,878

(22) Filed: Dec. 10, 1998

(30) Foreign Application Priority Data

Dec. 11, 1997 (DE) ......................... 197 55 129

(51) Int. Cl.$^7$ .............................................. G06F 17/00
(52) U.S. Cl. ........................ 707/10; 709/102; 709/105
(58) Field of Search ............... 702/1–206; 709/100–332

(56) References Cited

U.S. PATENT DOCUMENTS

| | | | |
|---|---|---|---|
| 4,731,817 A | 3/1988 | Jonsson et al. | 379/269 |
| 5,425,086 A | 6/1995 | Hidaka et al. | 379/139 |
| 5,978,802 A | * 11/1999 | Hurvig | 707/8 |
| 5,978,806 A | * 11/1999 | Lund | 707/10 |
| 5,978,815 A | * 11/1999 | Cabrera et al. | 707/204 |

FOREIGN PATENT DOCUMENTS

| | | |
|---|---|---|
| EP | 0263551 | 4/1988 |
| EP | 0400500 A2 | 12/1990 |
| EP | 0517268 A2 | 12/1992 |

OTHER PUBLICATIONS

Escobar et al., "An adaptive passivity–based controller for a unity power factor rectifier", Control Systems Technology, IEEE Transactions on, vol. 9, Issue 4, Jul. 2001, pp. 637–644.*

Huang et al., "Adaptive approach to load shedding including pumped–storage units during underfrequency conditions", Generation, Transmissioni and Distribution, IEE Proceedings– , vol. 148, Issue 2, Mar. 2001, pp. 165–171.*

Wang et al., "A series active power filter adopting hybrid control approach", Power Electronics, IEEE Transactions on, vol. 16, Issue 3, May 2001, pp. 301–310.*

Joakim Hasselgren, et al., "Handling Overload in AXE 10," Ericsson Review No. 3, 1995, pp. 124–131.

Joakim Hassel gren, et al., "Handling Overload in AXE 10," Ericsson Review, vol. 72, No. 3, Jan. 1, 1995, pp. 124–131, XP000543265.

* cited by examiner

Primary Examiner—David Jung
(74) Attorney, Agent, or Firm—Burns, Doane, Swecker & Mathis, L.L.P.

(57) ABSTRACT

To keep control of all relevant events in a real-time communication system, there is proposed a load regulation method for a central unit in this real-time communication system such that at least one job is submitted to a job buffer means (18) providing a pre-specified storage capacity. Further, jobs stored in the buffer means (18) are submitted to a processing means (22) for further processing. According to the invention, the available storage capacity of the buffer means (19) is updated dynamically according to the actually used job buffer capacity after each load regulation interval. Thus it is possible, to keep control of all major events and processes within the real-time communication system.

51 Claims, 32 Drawing Sheets

Fig. 3

```
PROGRAM; PLEX;
    ENTER SIGNAL 1;
    ....
    SEND SIGNAL 2;         } A SUBPROGRAM
    EXIT;

ENTER SIGNAL 3;
    ....
    SEND SIGNAL 4;         } A SUBPROGRAM
    EXIT;
    CUSELESS > 0;
    ENTER SIGNAL 5;
    ....
    SEND SIGNAL 6;         } A SUBPROGRAM
    EXIT;
    ENTER SIGNAL 7;
    ....                   } A SUBPROGRAM
    EXIT;
    ....
END PROGRAM;
```

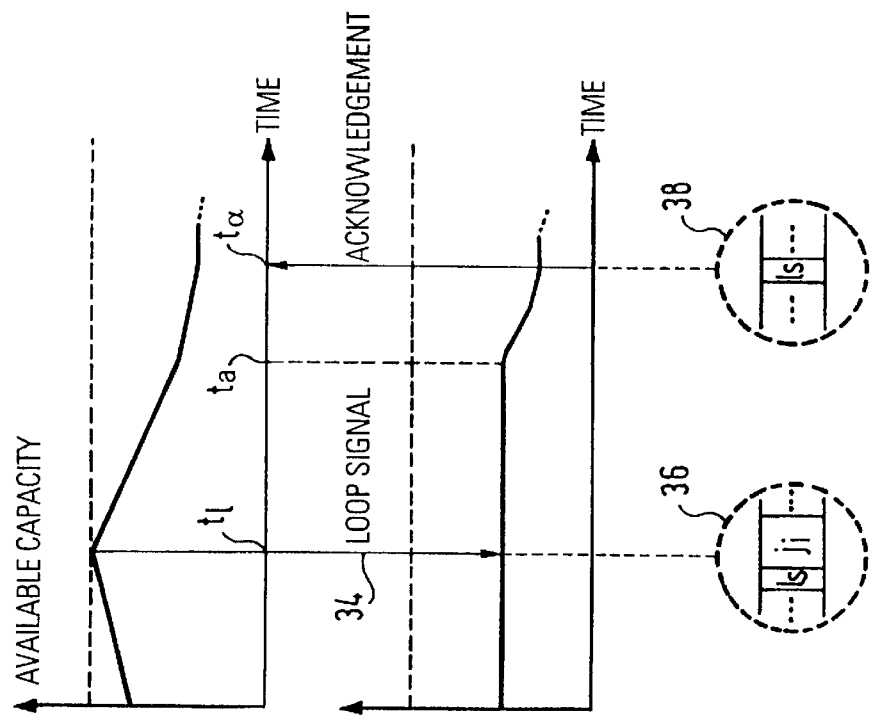
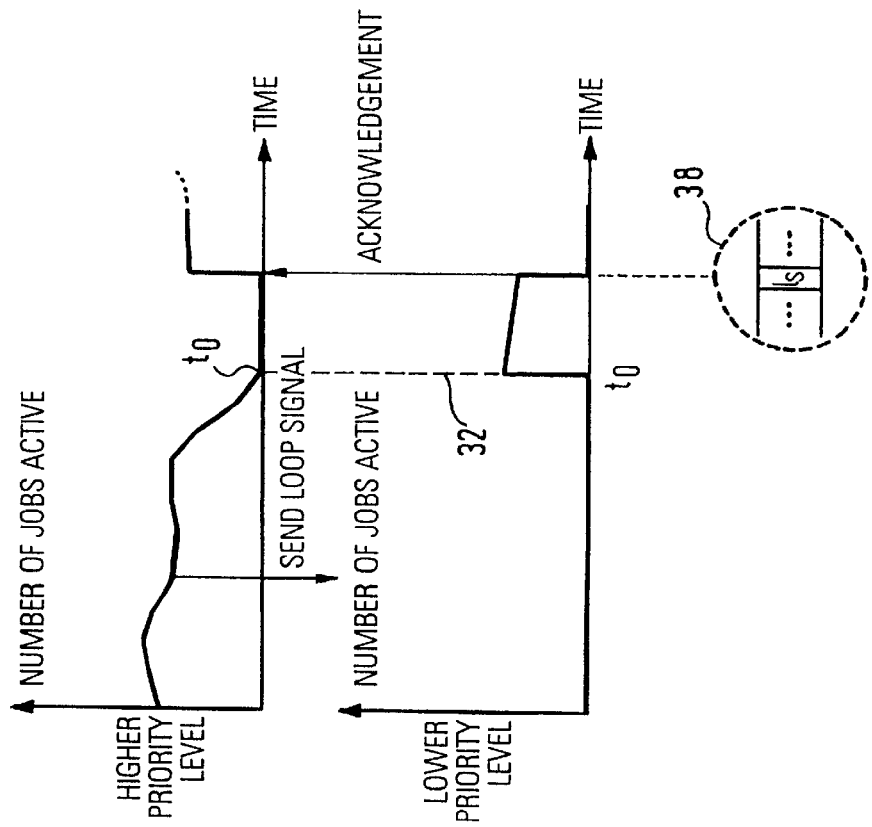
Fig. 16

LEVEL: PROCESSOR
INTERVAL: SUPERVISE PROCESSOR OVERLOAD DURATION-COUPLING TO JOB BUFFER CAPACITY REGULATION
TIME: REGULATION INTERVAL

LEVEL: SYSTEM
MODE: START-UP
TIME: SINGLE INITIAL EVENT

LOAD CONTROL AND OVERLOAD PROTECTION FOR A REAL-TIME COMMUNICATION SYSTEM

FIELD OF THE INVENTION

The present invention relates to a load control and overload protection device for a real-time communication system.

BACKGROUND OF THE INVENTION

The purpose of the load control function is to maintain a high flow of successfully handled calls during overflow conditions in a real-time communication system. This is achieved through regulating the accepted call intensity and the number of existing calls that can be disconnected by the real-time communication system taking into account the load situation of a central processor. The load regulation function does not affect the traffic process in normal traffic situations, however, it is intended to prevent an extremely high offered call intensity and/or call disconnection intensity from causing failure of the real-time communication system.

Usually, a call may be subdivided in to several jobs to be handled by the real-time communication system.

As job requests handled by the system may have real-time requirements such as dial tone delay and through connection delay according to ITU-T, the system must be able to handle an overload situation. Overload situations may arise when more jobs are offered per time unit than the system can handle. This means that the system may be heavily loaded and may not be able to accept all offered jobs. In other words, an overload situation can be seen as a peak of offered jobs, that last too long.

However, although a peak of offered jobs depending on the character of the jobs in question, may risk to overload, e.g., job buffers, it does not necessarily mean that the system is overloaded to the extent that real-time requirements can not be kept. To the contrary, the number of offered jobs may overload the system, so that real-time requirements can not be kept, although the job buffers are not overloaded. From this it follows that overload may occur for either any of the job buffers or a central processor CP or both at the same time.

An example for a load control and overload protection system to avoid an overload situation is shown in FIGS. 32 and 33 and described in Ericsson Review Number 3, 1995. This example relates to the load control and overload protection of a central processor CP handling call related events and other data communication processes in a SPC telephone system. Such a system is designed to handle a prescribed workload of call connections and related jobs.

One problem encountered in this context is how to protect the, e.g., the central processor PC from performance degradation or system failure in case traffic is more intensive than under normal conditions. Examples for such situations are televoting when a large number of subscribers starts making calls simultaneously that are transferred by regional processors RP to the central processor CP or networking failures during busy hour. Here, if no actions are taken, this will eventually lead to congestions and overflow of job buffers JB in the system where jobs are queued and the consequence would be a restart of the system and eventually stop scanning of external requests.

As shown in FIG. 32, there is provided a regional processor handler RPH which handles the signalling to and from the regional processors RP. Before the regional processor handler RPH distributes any external signals, i.e. signals from the regional processors, to the corresponding a job buffer in the central processor CP the occupation level of the buffer is checked. This is order not to overflow the job buffers by distributing signals to the job buffers faster than the central processor can fetch signals from the job buffers and execute the job initiated by each signal. If this would be the case the regional processor handler RPH will halt the distribution of signals to the job buffers JB in the central processor CP until the overload situation has ceased.

Equally the regional processor handler RPH will halt the distribution of external signals to the central processor CP for a certain time if the central processor CP has been permanently overloaded for a gross duration of time. This in order to allow the central processor CP to fetch and execute jobs queued in job buffers and eventually cease the processor overload situation.

Thus, the regional processor handler RPH carries out an autonomous flow control of external signals entering the central processor CP with regard to job buffer occupation, i.e. job buffer load. To some extent the regional processor handler RPH also helps avoiding permanent processor overload of gross duration, as an overload protection (not load control).

Signal(s) queued in any of the job buffers will be fetched by the operating system in the central processor CP and distributed to the appropriate application software for execution. As many different optional applications may be running the load control must be made in conjunction with the application software, as only the application knows what type of signal is received, e.g., if it is related to a call already in progress, to the connection of a call or to a new call for which processor load must be requested. For, e.g., messages in a service control point SCP in an intelligent network IN, processor load may be requested for initial, continue and end messages.

Each application will request processor load capacity from a load controlling function. The load controlling function employs a hierarchy of, e.g., 16 call buffers CB where requests may be temporarily stored, if not submitted capacity immediately, until the call set-ups continue. By using several buffers, it is possible to handle calls priorities so that call requests with different priorities are stored in different buffers.

As shown in FIG. 32, in case a call request arrives at the regional processor handler RPH it is analyzed to determine which job buffer JB it should be mapped to. In case of buffer capacity the delivery of signals is halted and the scanning of regional processors RP is stopped.

Otherwise, delivered signals and job requests are submitted to the central processor. To ensure that the work load offered to the central processor CP in an overload situation is close to its loadability limit, the number of collected job requests is regulated. Here, the regulation imposes an upper limit on the number of requests collected each time. This limit is adjusted once during every regulation interval, e.g., once every second. In case the load of the central processor CP is above a certain system dependent level the maximum number of collected requests is reduced. Further, in case the load is below a certain system dependent level the limit is again increased. Overall, the object is to keep the load of the central processor cP close to the loadability level during an overload situation.

Thus, load control incorporates mechanisms to keep throughput of requested jobs with real-time demands high under constant or slowly varying overload. To this end, the rate at which new calls are given service is regulated in case the load of the central processor CP is high. Here, in particular jobs corresponding to incoming calls are rejected if the load is too high. Overall, the load control mechanism is designed to be robust in situations involving various types of overload and traffic mixes so as to maintain adequate throughput and short delays in compliance with the telecommunication standard sector of the International Telecommunication Union, ITU-T.

FIG. 33 shows typical load control characteristics. The upper diagram in FIG. 33 gives a comparison of job throughput against offered traffic without load control (dotted line) and with load control (solid line). As shown in FIG. 33, the throughput without any load control will rapidly approach a level of zero in case no precautions are taken, while otherwise a throughput close to the maximum may be maintained. Similarly, as shown in the lower diagram of FIG. 33, without load control the delay time will rise considerably while being essentially constant in the case of load control.

One important principle being related to load control is called back pressure of overload and means to press traffic congestion backwards to the sources that generate overload. Generally, back pressure is exerted on signalling traffic by a central processor that either receives more signals than it is capable of handling or a central processor that cannot transfer signals, e.g., due to congestion in other exchanges. Within a specific exchange, back pressure is obtained by reducing the flow of signals towards the central processor CP.

Further methods are the gapping method where a limited number of requests per unit time is accepted and blocking where all affected requests are rejected.

Still further, so-called overload protection mechanisms are used. They are intended to protect the system from overload calls by traffic that is not controlled by the load control functions mentioned above. One typical example would be a rapid increase of call attempt intensity that the load control cannot be adapted to. Such situations might cause uncontrolled loss of signals and activation of recovery functions, e.g., system restart. Usually, overload protection mechanisms are designed to detect severe overload conditions quickly and to act fast so that alarm levels are set on certain buffers. In case an alarm level is exceeded, the signal flow towards the buffer is reduced until the buffer occupancy returns to a normal level which is also referred to as stop scan mechanism. Another option would be to simply stop the transfer of jobs from the call buffers to the central processor until the overload situation ceases.

However, within the existing concepts outlined above, problems arise as jobs being related to call disconnections and certain other call related events are not regulated. The reason for this is that it is currently assumed that call disconnections normally follow the intensity of call set-up jobs that are regulated. It should be noted that this is only true under normal circumstances and there are various events within a system itself or a network that can result in vast irregularities of, e.g., call disconnections and other call related events.

As outlined above with respect to FIG. 32, one option to protect the central processor CP against overload would be to limit the occupation of the job buffers JB and to stop delivering new jobs to the central processor CP. However, this only protects against externally initiated jobs and only to a certain extent. Further, this approach does not take into account the so-called extension factors of signals being related to different jobs, i.e. the amount of actual use of a capacity once a job is admitted to the job buffer. They are only controlling the number of jobs admitted to the job buffer. This might lead to severe overload in the job buffer in case signals with high extension factors are involved. This leads to another disadvantage that the job buffers might have a large margin to cope with eventual signal multiplication and forking and signal data expansion.

Another option currently in use is the job buffer occupation limit where the load regulation function for the central processor CP stops to distribute new call connection requests as well as other job requests. However, here it is not possible to get an impact on, e.g., call disconnections and other call related jobs and more generally jobs that do not seize processor load through this regulation mechanism.

For non-regulated jobs another method would be to split these jobs over different phases in order to even out the load. While this simple method of running probability statistics will work for certain simple systems it cannot be trusted in large complex systems.

From the above, it follows that with growing systems and increasing complexity the need for coordination between jobs according to call related events, maintenance events and other possible events is increasing. Also, the task to overview different functions and predict events that can occur simultaneously, interact and result in hazardous overload situations becomes more and more difficult, resulting in an increased congestion of the job buffers of the central processor.

SUMMARY OF THE INVENTION

In view of the above, the object of the invention is to keep control of all relevant events in a real-time communication system.

According to a first aspect of the invention, this object is achieved through a load regulation method for a central unit in a real-time communication system, comprising the steps of submitting at least one job to a buffer means providing a pre-specified buffer capacity, submitting the job queued in the buffer means to a processing means for further processing, and dynamically updating the available buffer capacity of the buffer means according to the actually used job buffer capacity after each load regulation interval.

One important advantage of the inventive method is that it is possible to keep control of all major events and processes within the real-time communication system. Also, the control mechanism is not restricted to the system level but may to a certain extent be distributed to a user function. In addition, the efficiency of the load regulation method allows for low overhead added to the real-time communication system which has been one of the arguments against the regulation of, e.g., call disconnections.

Still further, in case normal operation conditions prevail the inventive load regulation method will not delay any submission requests.

Also, according to a second aspect of the present invention, the object is achieved through a load regulation method for a central unit in a real-time communication system, comprising the steps of submitting at least one job to a buffer means providing a pre-specified buffer capacity for each of a plurality of job execution priority levels, submitting the jobs queued in the buffer means to a processing means for further processing according to the job execution priority level, respectively, interrupting a task on a lower job execution priority level in case a job on a higher job execution priority level is submitted to the buffer means, executing dynamic control of the load of the processing means by sending a loop signal to a lower priority level in case the seized job buffer capacity reaches the maximum available job buffer capacity on a higher priority level, and resuming processing of jobs on the higher priority level in case an acknowledgement is received on this level after the processing of the loop signal on the lower priority level.

Besides the advantages outlined with respect to the first aspect of the invention, according to the second aspect of the invention it is also possible to distinguish between priority of different submitted jobs/processes and to achieve a regulation therefore.

Still further, the loop sending mechanism according to the present invention allows for a very efficient dynamic control on the processor load. The reason for this is that once a loop signal is sent down to a lower level in case the maximum available capacity is seized on a high level, and once the acknowledgement for processing on this loop's signal on the higher level is again received on the upper priority level, is a clear indication that all capacity is then again available on the higher level. Therefore, the start of a new regulation interval must not be awaited but the processing may be resumed on the higher level immediately upon receipt of the acknowledgement from the lower level. This allows for a dramatic increase of system efficiency.

According to a third aspect of the invention, the object of the invention is achieved through a load regulation unit for a real-time communication system, comprising buffer means providing buffer capacity for jobs to be processed in the real-time communication system, processing means handling the jobs submitted to the buffer means, and load regulation means adapted to dynamically adjust the available buffer capacity of the buffer means in dependence on the actually seized job buffer capacity at the start of every load regulation interval.

According to the third aspect of the invention the same advantages may be achieved as with the first aspect of the invention. Further, according to the third aspect, the number of jobs allowed to the central processor, which are allowed to be executed per load regulation interval, is related to the available job buffer capacity instead of being regulated directly by a processor load regulation function as in the state of the art. Any job queued in the job buffer is fetched in order to queuing. It is then up to each application receiving the job to request either processor load or job buffer capacity depending on the type of job. If the job is not submitted it is up to the application to decide if the job should be rejected or queued internally, within the application, until capacity is available. Thus, the central processor is protected from being overloaded by maximum events or by unpredicted interactions between two or more different events either of which would otherwise result in buffer congestion and processor overload, respectively.

Further, according to a fourth aspect of the present invention, the object outlined above is achieved through a load regulation unit for a real-time communication system, comprising buffer means providing buffer capacity for each of a plurality of job execution priority levels, processing means handling the jobs submitted to the buffer means, and load regulation means adapted to submit a job to the buffer means according to the respective job execution priority level and the available buffer capacity assigned to the job execution priority level, to send a loop signal to a lower priority level in case the seized buffer capacity in the buffer means reaches the maximum available buffer capacity on the higher priority level, and, to resume the processing of jobs on the higher priority level in case on processing of the loop signal on the lower priority level an acknowledgement is sent up to the higher priority level.

Thus, each priority level in the load regulation unit has its own job buffer for jobs to be submitted on the priority level in question. Thus, it is possible to distinguish between different job priorities for jobs on a priority level which are now regulated. In case of scarce capacity jobs will either be queued by the load regulation function or the application or both, i.e. jobs queued by the load function will be put in queue assigned for the priority in question. Also, the processor load may be indirectly distributed over time and be minimized according to system safety margins. Finally, any overload situation which might arise is dealt with rapidly and efficiently.

Further, the job buffer capacity load regulation is not restricted to a specific priority level but it may alternatively or additionally be adapted to one or more priority levels. In such a case the job buffer capacity load function must be adapted to the differences in real-time requirements.

According to a preferred embodiment of the invention a user function may indicate a request to be of the all of requested or any available type. The former one is related to, e.g., user functions with regular requests running continuously and seize a pool of capacity for use whereafter it is needed, e.g., call disconnections. This user will have a distributed pool of capacity which is continuously used and renewed through new seizure. The latter is related to, e.g., user functions with non-regular requests for job buffer capacity. This capacity is seized only as it is needed and used at each particular time.

Here, according to the invention there is considered the fact that certain jobs with high real-time demand for processor load may suffer if there corresponding requests for job buffer capacity are queued in case no job buffer capacity is available. Thus, according to this preferred embodiment of the invention the job buffer capacity load function is adapted such that a user function may indicate that its corresponding request for job buffer capacity may not be queued but must either be acknowledged or rejected immediately. Also, the job buffer capacity load function may be modified to override available capacity in a specific job buffer capacity regulation interval depending on the processor load situation by assigning job buffer capacity to such a request. This is possible due to the large safety margin of the job buffer capacity.

Further, according to yet another preferred embodiment of the present invention the available job buffer capacity is recalculated at the beginning of each load regulation interval.

Thus, the calculation of available job buffer capacity with every load regulation interval or sub-interval allows to adapt the previous estimation to the actually existing present job buffer occupation. This allows to reassign overestimated job buffer capacity at the beginning of every sub-interval, so that the dynamic adaptation of available job buffer capacity leads to an increased utilization of available resources.

Further, according to yet another preferred embodiment of the invention also critical overload situations are supervised. In particular, the lowest priority level may be supervised in order to detect any critical delay of execution so that it is possible to reduce or stop the execution of jobs on higher priority levels momentarily. Thus, it is possible to cut down on the execution rate and higher priority levels in order to allow execution of jobs on lower priority levels in critical overload situations.

Further, according to yet another preferred embodiment of the invention an interrupt may be received from the operating system in case of high job buffer load.

Thus, according to the present invention there is also provided an operating system detection of high job buffer load. In particular, according to the present invention the operating system can detect hazardous growth of job buffer occupation immediately and may then call the load regulation mechanism according to the invention to take immediate action, e.g., clear available job buffer capacity, clear job buffer capacity distributed to different users, and disable any new job requests, respectively. This feature of the invention allows for an even more powerful and flexible control of the available job buffer capacity. Further, any system malfunctioning is avoided at the very beginning.

Another feature of the present invention is the simultaneous use of the regulation steps outlined above on a plurality of priority levels or on lower priority levels, respectively. If the regulation features are used on a lower priority level such as the, e.g., C-priority level it must be adapted to the difference in real-time conditions. Here, it is necessary to subscribe on the job buffer capacity until the job is finished and then the capacity is returned to the regulation function. This also means that the amount of distributed job buffer capacity needs to be adapted.

Also, it should be noted that the regulation functionality according to the invention is not only to be used for previously un-regulated functions. To the contrary, according to the present invention, also previously regulated functions with high signal data expansion factor could be considered, e.g., a job that will result in several jobs or processes for which it is necessary to keep a better control.

BRIEF DESCRIPTION OF THE DRAWINGS

Preferred embodiments of the present invention will be described with respect to the drawing in which:

FIG. 3 shows the structure of software application units running in the real-time communication system shown in FIG. 1;

FIG. 16 shows the dynamic control of processor load through the load regulation unit according to the invention;

DESCRIPTION OF PREFERRED EMBODIMENTS

In the following, one embodiment of a real-time communication system underlying the present invention will be explained. Usually, such a real-time communication system relies on the concept of signalling, program statements concerning signals, and addressing the program store and in job buffers.

Such a real-time communication system according to the invention, and a typical process sequence for a call set-up therein will be explained with respect to FIG. 1.

Figure 1:
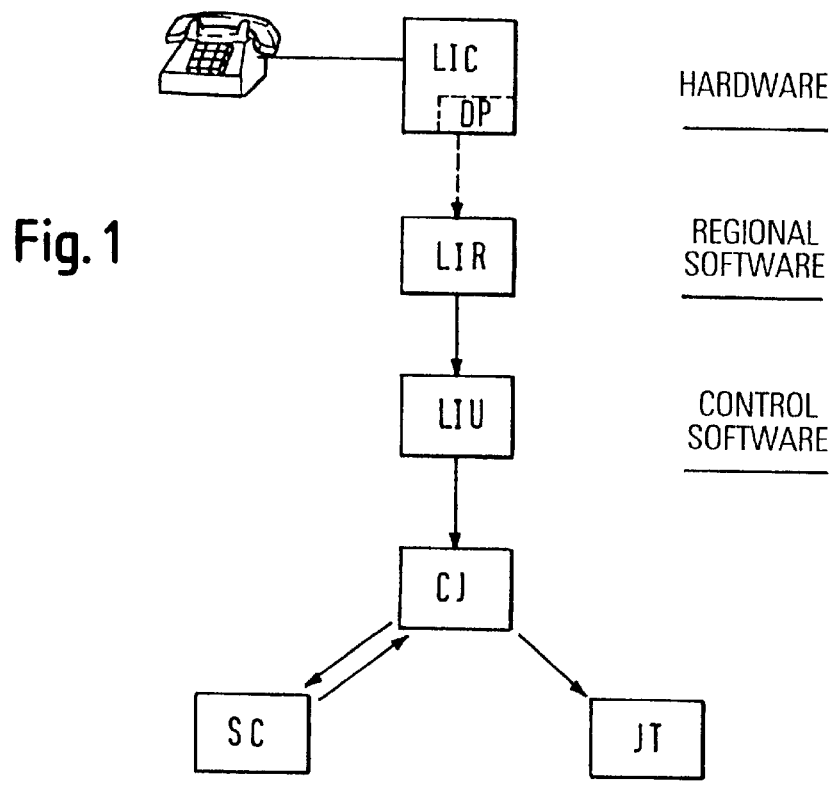
FIG. 1 shows a structure of a real-time communication system and the signal flow during call set-up.

As shown in FIG. 1, a subscriber lifts a handset which action is detected by a line interface circuit LIC. Here, all hardware devices are frequently and regularly scanned by simple microprocessors called device processors DP. Further, the device processors DP in the line interface circuit LIC are scanned by regional software LIR. To generate a link to an exchange the regional software will transfer the information "handset-of-hook" to a central software LIU that informs a combined juncture CJ. The combined juncture CJ asked the juncture terminal JT to reserve a channel through the group switch for this call. The next step then is to find out whether the subscriber has been assigned any facilities. This information is stored in the block subscriber categories SC.

At the interface between the regional software LIR and the central software processor load capacity for the central processor CP in the combined juncture CJ is requested. If this request is rejected the regional software LIR will receive a reject message and central processor CP signalling with respect to the initiated communication process stops at this point.

Figure 2:
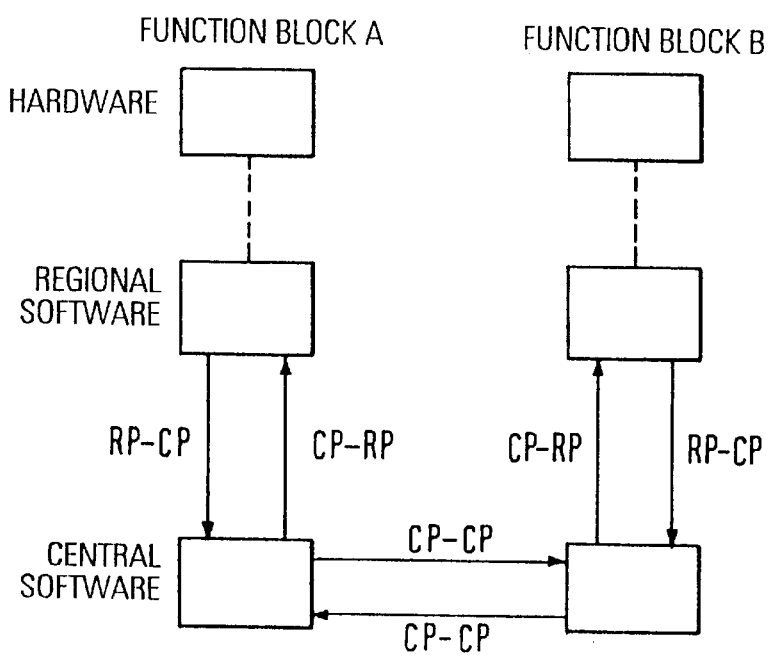
FIG. 2 shows the different types of software signals used in the real-time communication system shown in FIG. 1.

Thus, communication between different function units is performed by means of signals. In other words, as shown in FIG. 2, a signal is usually a jump from one function block to another. All signals between different function blocks A, B are sent from and to their respective central software LIU. Signals between different combined junctures CJ are called CP-CP signals. Further, signals from a regional software LIR to the respective central software LIU are called RP-CP signals, and likewise, signals from the central software LIU to the regional software LIR are called CP-RP signals. Further, a signal is defined by its signal description where the number of signal data, signal type and purpose of the signal, etc., is stated. Thus, there is one signal description for every signal.

As shown in FIGS. 2 and 3, signals usually serve to link different applications running, e.g., different nodes of the real-time communication network. Most signals are related to a jump from a signal-sending statement in a program to a signal-receiving statement in another program. This implies that a program is never executed from the beginning to the end, but usually from a signal-receiving statement, normally ENTER, to a signal-sending statement, normally SEND, followed by the EXIT-statement. With the EXIT-statement the current program is left and the operating system takes over. Here, the program sequence between the ENTER-statement and the EXIT-statement will be called a sub-program. According to the examples shown in FIG. 3, in case the signal 3 is entered and the signal 4 is sent, the program statement CUSELESS=0 will never be executed.

During the transfer of signals in the real-time communication system delays will usually occur. The reason for this is that the combined juncture CJ usually handles several calls simultaneously while the related central processor CP can only execute a single program at a time. Thus, it is obvious that the signal must be queued somewhere. This is done using job buffers and, job tables for time queues, respectively. Further, since some signals are more important than others, different job buffers with different priorities are introduced. One example would be to introduce four different job buffers being called A, B. C and D, respectively, with A being the highest priority.

Figure 4:
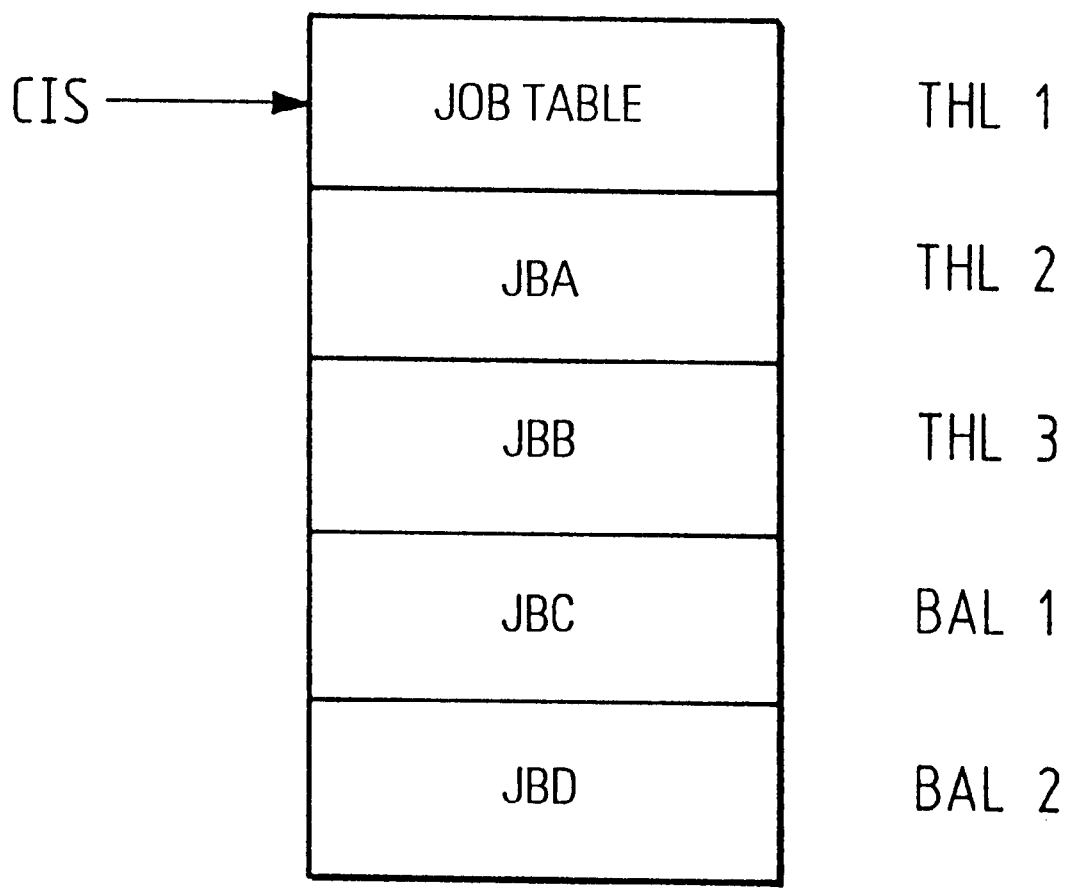
FIG. 4 shows different levels of hierarchies for applications running in the real-time communication system shown in FIG. 1.

As shown in FIG. 4, there usually are provided several job buffers for CP-CP and RP-CP signals. These, e.g., are called job buffer JBA, job buffer JBB, job buffer JBC, and job buffer JBD, where job buffer JBA is the one with the highest priority.

Usually, the job buffer JBA is used by the operating system for urgent tasks and for preferential traffic. Further, the job buffer JBB is used for handling all other telephone traffic, and the job buffer JBC is used for handling input/output. Finally, the job buffer JBD is used for retaining self-test tasks. Here, the job buffers correspond to different priority levels and the priority level of each signal is specified in its signal description. Usually, within each buffer the first in/first out principle applies so that the oldest jobs are executed first.

Besides the job buffers there is also used a job table shown in FIG. 4 that contains jobs that are to be executed at short periodic intervals, e.g., incrementing clocks for time supervision. Since the job table contains jobs that are to be executed at short periodic intervals, the job table receives a clock interrupt signal CIS sent by system hardware to achieve fast execution of jobs stored in the job table. Thus, the job table may be used to initiate the handling of jobs. Jobs running are queued in the job buffers, e.g., any call being initiated (software signal) phases through a job buffer before being distributed by the operating system to the appropriate application software, which in its turn will have to request capacity for further execution, i.e. utilization of central processor capacity including job buffer. Further, a job table signal is distributed to subscribing application software for appropriate execution. If necessary, e.g., a request of job buffer capacity must be determined by the application software.

Using the system architecture, the classification of signals, and the structure of buffers as outlined above, job handling in the real-time communication system will be executed as follows.

In the following a job is defined as a continuous sequence of statements executed in the processor. A job begins with an ENTER-statement for a buffer signal and it ends with an EXIT-statement following the sending of one or more buffer signals as explained with respect to FIG. 3. In any job, direct, single, and combined statements can be used so that a job is not limited to one CP software application and that several applications may be related to a job.

Depending on the purpose and timing requirements jobs are assigned to certain priority levels, as shown in FIG. 4. Tasks initiated by a periodic job table signal use the traffic-handling level THL1, JBA signals use traffic-handling level THL2, JBB signals use traffic-handling level THL3, JBC signals use base level BAL1, and JBD signals use base level 2 BAL2. Thus, the job table has a higher priority than all job buffers. Further, the job buffer JBA has a higher priority than the job buffer JBB, and so forth.

The clock interrupt signal CIS shown in FIG. 4, is sent every ten milliseconds and interrupts and activates program execution. The CIS makes the primary interval of the central processor CP. In case the clock interrupt signal CIS arrives the job table is scanned and tasks are activated.

Figure 5:
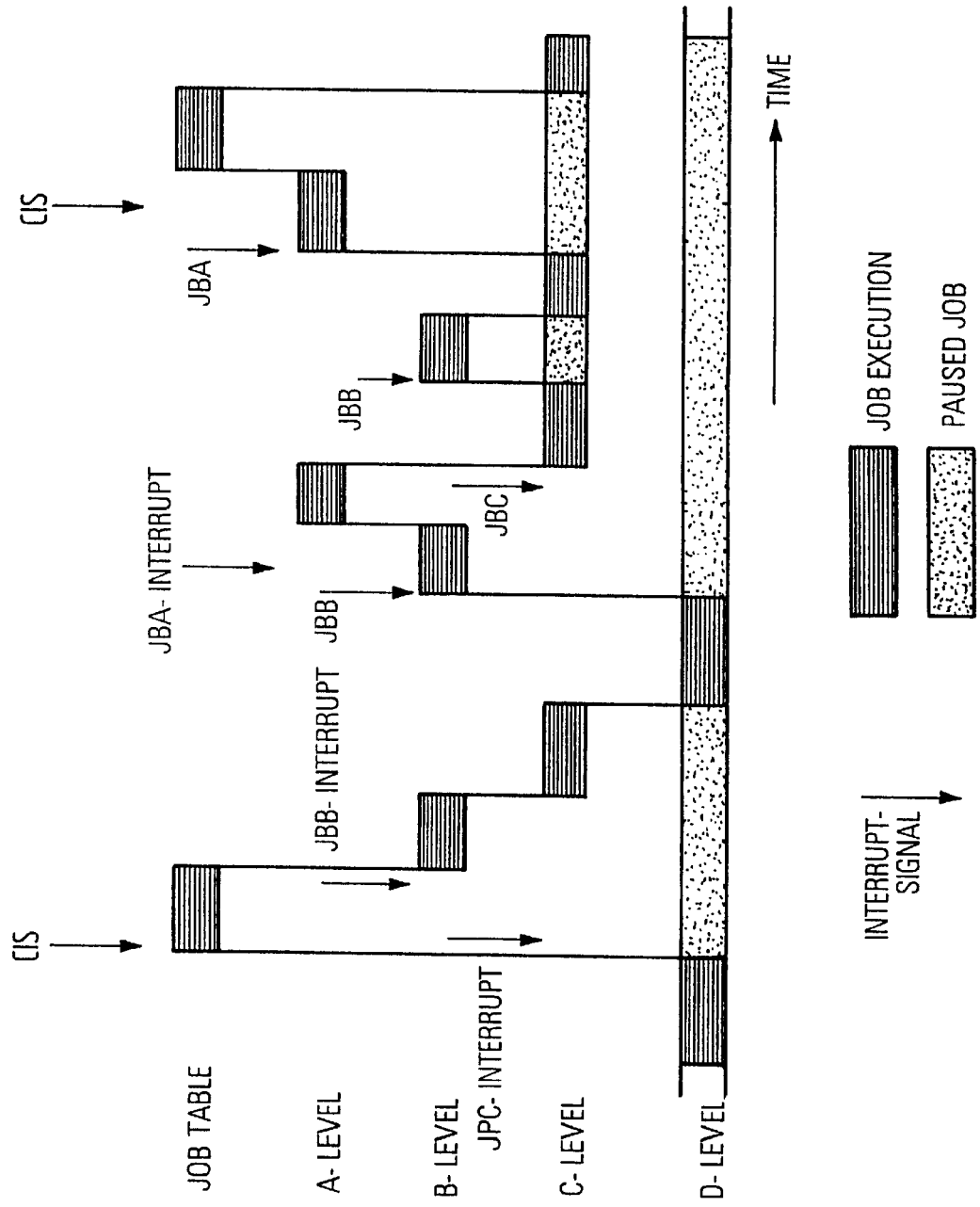
FIG. 5 shows a sketch of job execution for application running on different priority levels in the real-time communication system shown in FIG. 1.

Further, in case a new job is inserted into a job buffer, an interrupt signal is sent at the priority level. In case the on-going job processed by the central processor has a lower priority level, that job will also be interrupted. Here, interrupt signals from JBA, JBB and JBC are recognized even between two successive clock interrupt signals CIS. For example, if there is a job at the C-level and an interrupt signal comes from the A-level, this interrupt will not have to wait for the next clock interrupt signal CIS but will be executed immediately. The relation between program level priority, the contents of the job table and job buffer, respectively, and the job types is shown in FIG. 5 and may be summarized as follows:

A typical flow of job execution according to the rules outlined above, may be as shown in FIG. 5. Here, a job is executed on D-level when the clock interrupt signal CIS arrives. The D-level job is immediately interrupted and the job table is scanned. During scanning there are two clock interrupt signals, one from the C-priority level and the other from the B-priority level. After scanning the job table the job of the B-priority level is handled because it has the higher priority. The task on the B-priority level is then followed by the waiting job on the C-priority level and afterwards the D-priority level job may resume its execution since there are no other jobs waiting.

A short time later, the D-priority level job is interrupted again by an incoming interrupt signal at the B-priority level. During execution of the B-priority level another interrupt signal at the A-priority level arrives. Here, the job at the A-priority level must wait until the job at the B-priority level has been finished. The job at the A-priority level is followed by a job at the C-priority level which in turn is interrupted by a job at the B-priority level having higher priority. Finally, the job at the C-priority level is interrupted by another incoming signal at the A-priority level. During the execution of this job at the A-priority level the clock interrupt signal CIS is received. Nevertheless, the processing of the job table signals has to wait until the A-priority level is terminated. Consequently, the periodic delay time for job table tasks are not normally 100% accurate.

Figure 6:
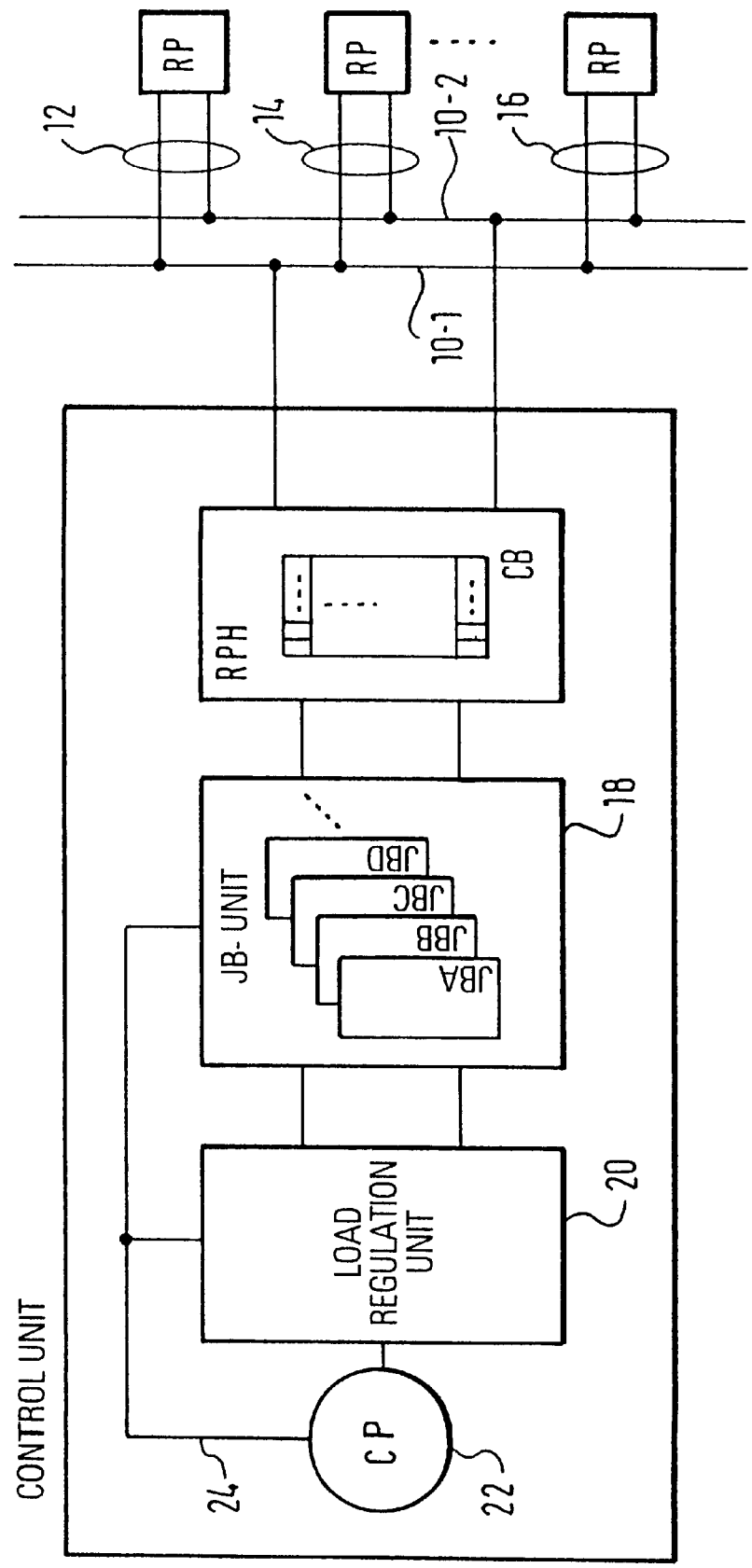
FIG. 6 shows a block diagram of the central unit of the real-time communication system with a load regulation unit according to the present invention.

In the following, the load regulation unit according to the present invention as shown in FIG. 6 will be explained on the basis of the system architecture and principles outlined above.

Figure 32:
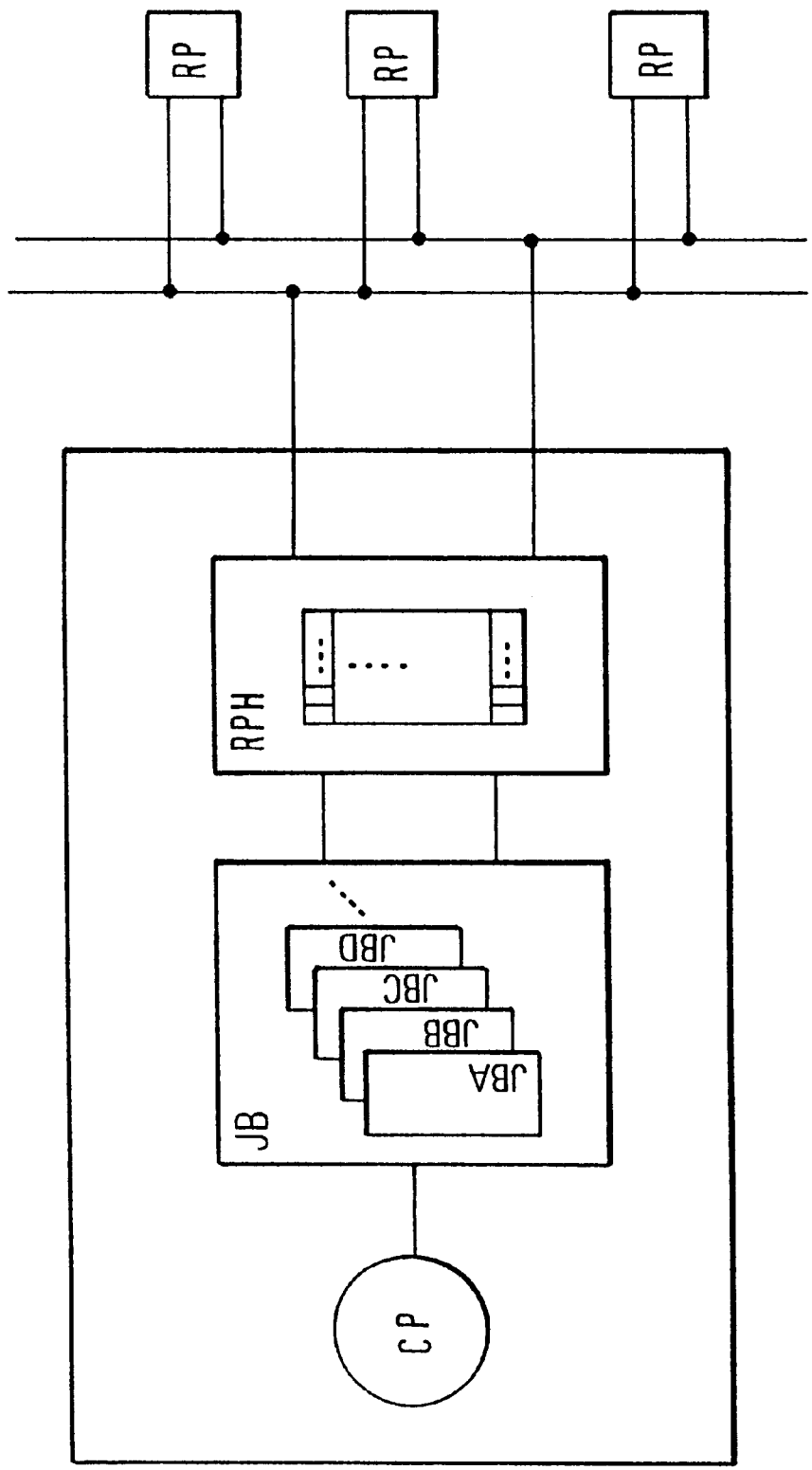
FIG. 32 shows a block diagram for the load control of a central processor in a real-time communication system according to the technological background of the invention.
Figure 33:
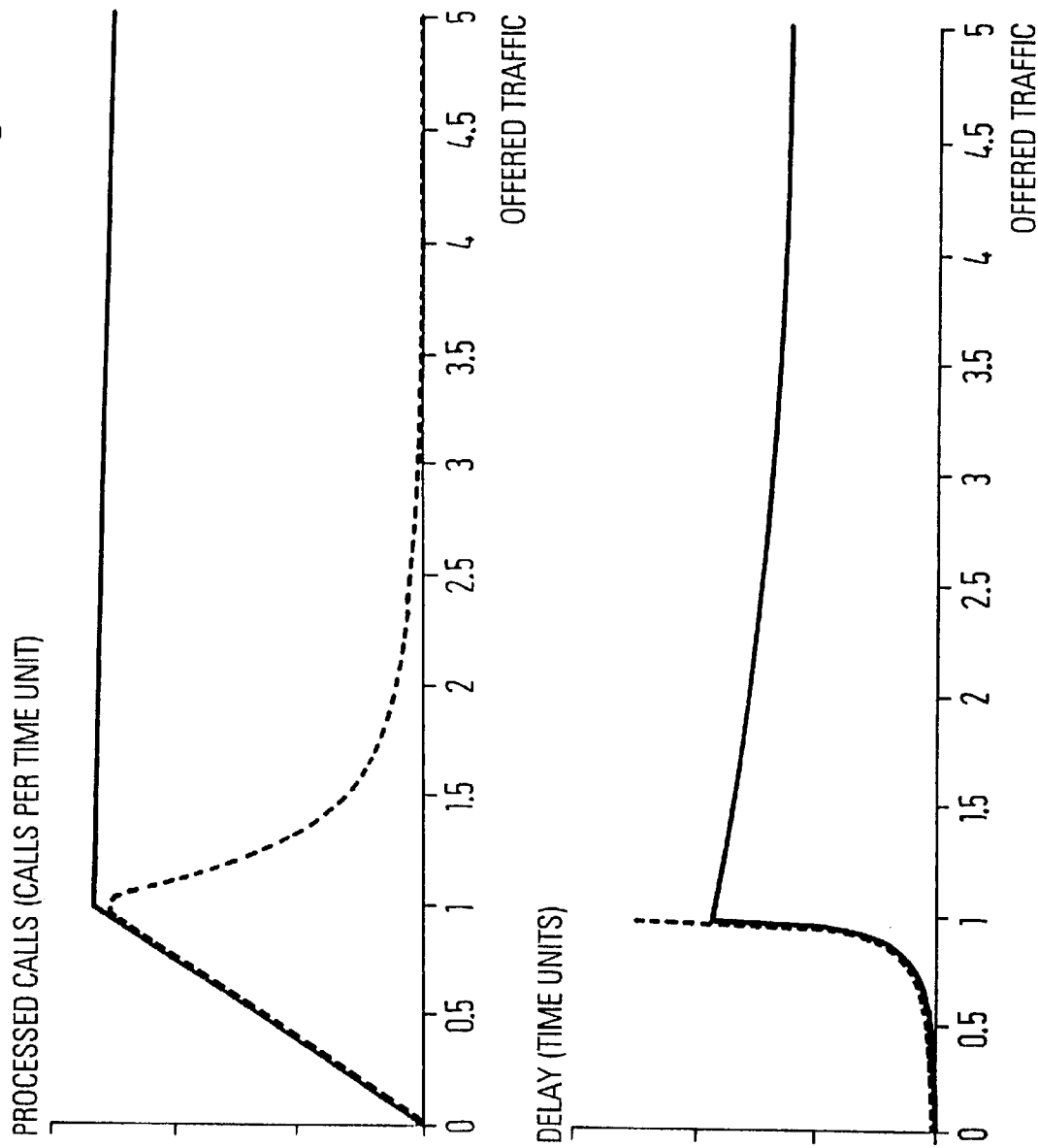
FIG. 33 shows the throughput and delay characteristics being related to the functional block shown in FIG. 32.

The central unit of the real-time communication system has components similar to those shown in FIG. 32. In particular, the central unit comprises a regional processor RPH to handle the interface between the job buffer unit JB and the regional processor RP operating at remote positions. Here, main connection lines 10-1 and 10-2 are attached to the regional process handler RPH, and further the regional processors are connected to these main connection lines 10-1, 10-2 via links 12, 14, . . . , 16, respectively. As explained with respect to FIG. 32, the regional process handler RPH may also comprise call buffers. As the functionality of these components is basically unchanged, an explanation thereof will be omitted here.

As shown in FIG. 6, the present invention is mainly related to the link between the central processor 22 and the job buffer 18. In particular, according to the invention there is provided a load regulation unit 20 that is linked,. both to the central processor 22 and the job buffer unit 18 via a control link 24. It should be noted that the load regulation may be implemented both in hardware and software.

Figure 7:
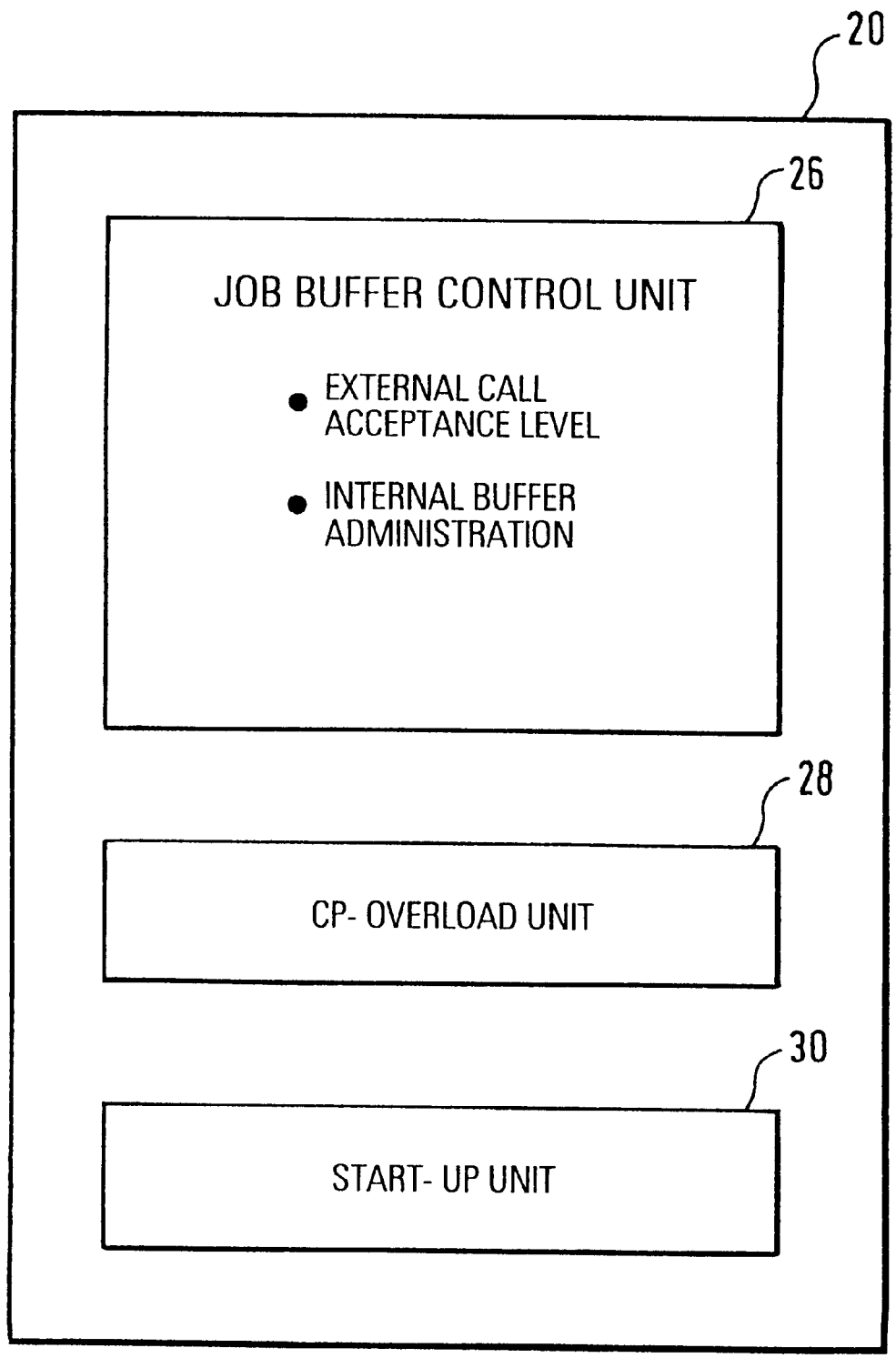
FIG. 7 shows a more detailed block diagram of the load regulation unit according to the present invention.

A more detailed representation of the load regulation unit is shown in FIG. 7. In particular, the load regulation unit 20 comprises a job buffer control unit 26, a central processor overload unit 28, and a start-up unit 30. The functionality of the job buffer control unit 26 is to regulate either the acceptance level for externally received calls or to execute the internal buffer administration of the plurality of buffers JBA, JBB, JBC, . . . shown in FIG. 6. Further, the functionality of the central processor overload unit 26 is to supervise the load condition of the central processor 22 to make optimal use of the processing capacity provided by this processor. Finally, the start-up unit 30 is provided to execute control of the system during the start-up at the very beginning of operation.

Figure 8:
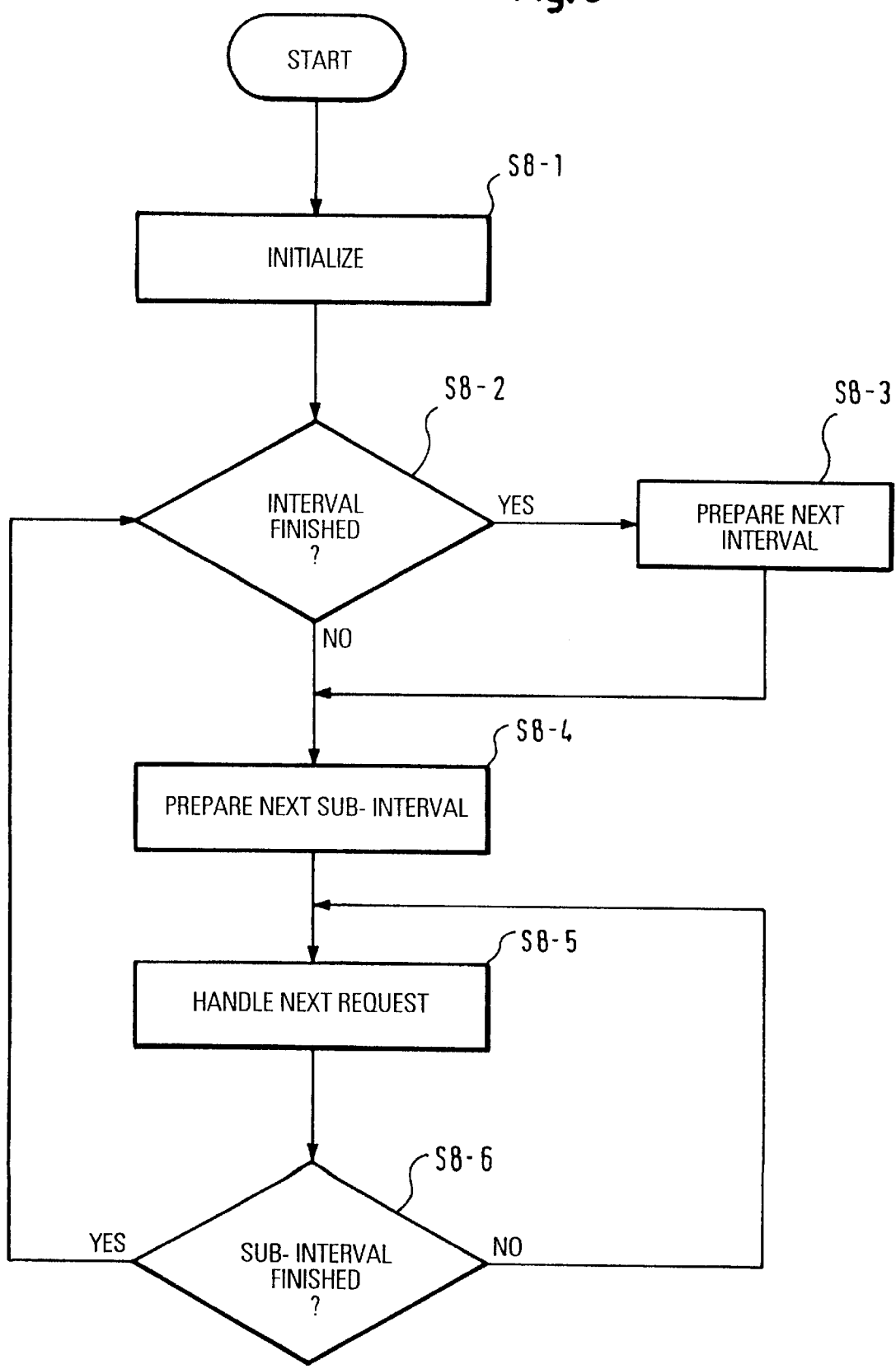
FIG. 8 shows a flow diagram according to the basic operation of the load regulation unit shown in FIG. 7.

As shown in FIG. 8, the job buffer control unit 26, the central processor overload unit 28, and the start-up unit 30 carry out an interleaved execution of processing steps. In step S8-1 the start-up unit 30 will execute the functions to enter normal operation. Also, according to FIG. 8 there are provided two interrogation steps S8-2, and S8-6, respectively. The first one is executed to check on whether an interval has finished and the second one is executed to check on whether a sub-interval has finished. It should be noted that each interval comprises a plurality of sub-intervals.

Thus, the operation of the load regulation unit 20 is executed to a plurality of time scales being related to longer and shorter time intervals, respectively, according to different regulation steps. In other words, there are certain regulation steps that are executed more often than other regulation steps. Here, the inner loop is related to the sub-interval and to the handling of new incoming requests according to step S8-5. As long as the sub-interval has not finished, cmp. step S8-6, these incoming requests are handled through the load regulation unit 20.

However, any time such a sub-interval has finished it is checked in step S8-2 whether a larger interval comprising, e.g., 25 sub-intervals of 40 milliseconds is finished. If this interrogation is affirmed, the next interval is prepared in step S8-3 which step serves to carry out regulation steps to be described in the following. However, in case the interval is not finished, or equivalently, in case, e.g., 25 sub-intervals have not been executed subsequently, only the steps to prepare the next sub-interval are carried out in step S8-4.

Figure 9:
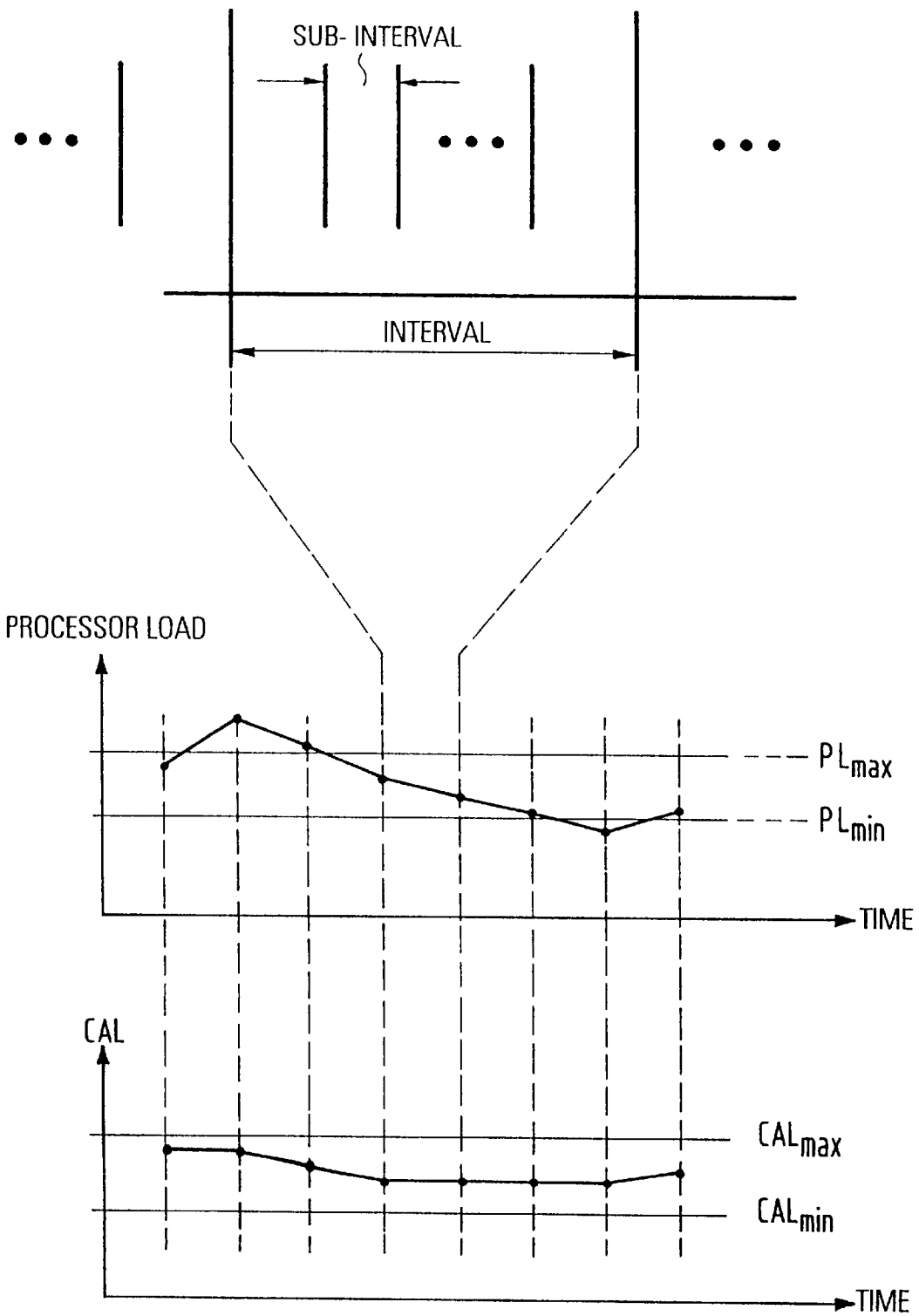
FIG. 9 shows an example for the preparation of every interval of operation of the load regulation unit according to the invention.

As shown in FIG. 9, the operation of the load regulation unit 20 thus is carried out on different time scales specified through intervals and sub-intervals and being related to different real-time requirements underlying the system operation. As will be shown in the following, this interleaved execution of regulation steps allows for a very efficient protection against overload of the central processor 22 and the job buffers JBA, JBB, JBC, . . . in the job buffer unit 16.

FIG. 9 shows the concept underlying the regulation steps executed with every interval of, e.g., one second, cmp. step S8-3 in FIG. 8. This step is based on the concept of call acceptance limit where the number of calls offered to the central unit and which is accepted for a service by this unit, is limited. As shown in FIG. 9, this call acceptance limit CAL is related to the processor load.

In particular, at the end of every interval the load regulation unit 20 requests the value of the processor load of the previous intervals. The load regulation unit 20 uses these load values over the previous, e.g., five intervals, to calculate and update the call acceptance limit CAL for the next interval.

In particular, the total processor load is calculated by weighing the processor load values for the last five intervals according to $$PL = \frac{PL(T)}{4} + \frac{PL(T-1)}{4} + \frac{PL(T-2)}{4} + \frac{PL(T-3)}{8} + \frac{PL(T-4)}{8} \quad (1)$$

In case the value of PL is between the upper limit $PL_{max}$ and the lower limit $PL_{min}$ the value of CAL remains unchanged for the next interval. However, if the value of PL is above the upper limit $PL_{max}$, the call acceptance limit CAL will be decreased according to $$CAL \leftarrow (FR^*60)/100 \quad (2)$$

where FR is the number of collected requests during the previous interval and α is an application dependent decrease factor. For ordinary traffic mixes the recommended value of α is 98.

Further, the value of the call acceptance limit must not fall under a minimum value $CAL_{min}$ which is set by command. This minimum value $CAL_{min}$ is used to guarantee that a certain amount of the processor capacity is reserved for call handling. In case a value of PL falls below the lower limit $PL_{min}$ the call acceptance limit CAL is increased according to $$CAL \leftarrow CAL + \max\left[1, CAL\frac{(100-PL)}{\beta}\right] \quad (3)$$

where $\beta$ is a parameter with a recommended value of 660.

Still further, the value of the call acceptance limit CAL must not rise above a maximum value of $CAL_{max}$ that is also changed by a parameter. The maximum call acceptance limit $CAL_{max}$ is set to a value which is far higher than the capacity of the central processor 22. Thus, short peaks in call arrivals may be accepted and if the arrival intensity is high during only a short period there is no need to reject calls since enough processor capacity will be available.

Overall, FIG. 9 shows the measures taken during step S8-3 so as to specify the maximum number of requests to be accepted in each sub-interval which is maintained constant over several sub-intervals and only updated for every interval. Besides this regulation of the external call acceptance limit CAL, in the following the internal buffer administration according to step SB-4 shown in FIG. 8 will be explained with respect to FIG. 10.

As already outlined above, the present invention represents a solution where the number of jobs allowed is related to the job buffer capacity of the different job buffers JBA, JBB, JBC, . . . . Thus, instead of regulating the jobs in question through a processor load regulation as in the art, these jobs are regulated after job buffer capacity. Here, only a certain amount of jobs is led through to the central processor 22 at any time.

This method relying on job buffer flow control protects the central unit 20 from being overloaded by mass events or unpredicted interaction between different processes running in the central unit, i.e. events that eventually can result in buffer congestion and severe malfunctions. Also, as this regulation method allows to distribute capacity or to a certain sense also the load regulation so that the overload is also minimized.

Figure 10:
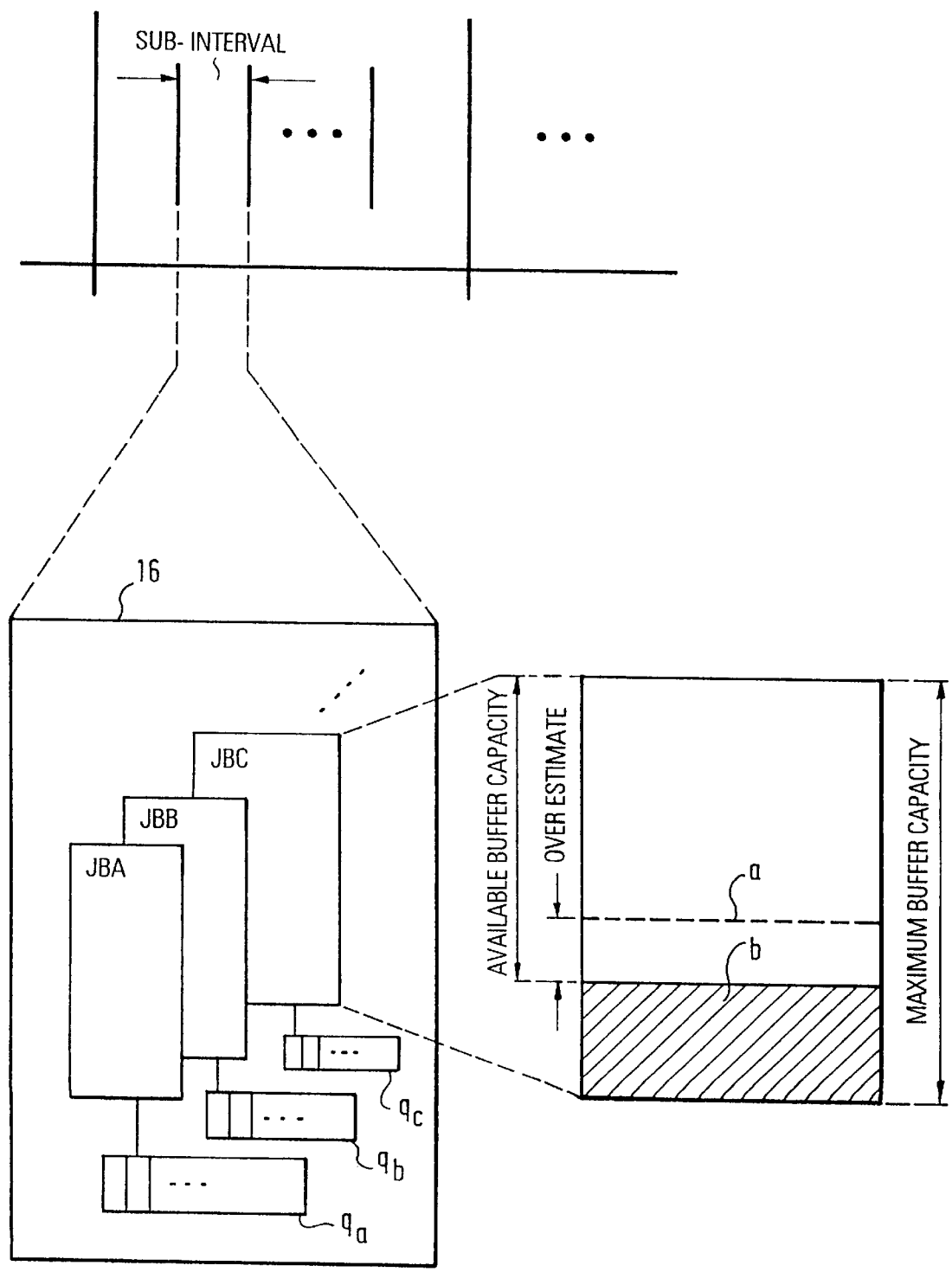
FIG. 10 shows an example of the preparation of every sub-interval for the operation of the load regulation unit according to the invention.

As shown in FIG. 10, the load regulation according to the invention is also based on a system with different priority work levels A, B, C, . . . where each level has its own job buffer JBA, JBB, JBC. Here, a job on the higher priority level where, e.g., a data processor task is carried out, will interrupt a job on a lower priority level as outlined in detail above. Examples of priority level in order from the highest to the lowest are:

Priority level A: This priority level is not used for normal functions but for, e.g., the operating system at malfunctioning.

Priority level B: This is the work level for the actual application, e.g., the telephony traffic or the data processing communication.

Priority level C: This is the level for operation and maintenance functions, e.g., input/output functions such as man-machine interface output of data processing related data such as telephony charging data, etc.

Priority level D: This lowest priority level is, e.g., used for routine maintenance functions.

Clearly, the sequence of priority levels A to D outlined above is only to be considered as an example and not to be construed as limiting the present invention.

As shown in FIG. 10, the load regulation unit 20 according to the present invention is adapted to regulate the flow of jobs in job buffers JBA, JBB, JBC, at the beginning of every sub-interval. Here, each function that is regulated with the load regulation unit 20 should seize a part of job buffer capacity. According to the invention, the job buffer capacity for each priority level that is available for use is assigned dynamically for every sub-interval depending on the present job buffer capacity used.

In addition, the queues $q_a$, $q_b$, $q_c$, . . . , allow to queue requests in case the capacity available for a certain sub-interval is not sufficient. In case job buffer capacity is available again, the queued requests are assigned job buffer capacity and may then be executed being shortly delayed, however, without any information with respect to regulated functions being lost.

In the following, more details with respect to the calculation of job buffer capacity for each sub-interval will be described with respect to FIG. 10.

The first point to be considered at the beginning of each sub-interval by the load regulation unit 20 is the maximum job buffer capacity available. This maximum job buffer capacity corresponds to the maximum number of jobs that may be assigned to a job buffer and that is limited by the job buffer size provided for functions which request job buffer capacity when needed and functions which request a so-called capacity pool in advance before the operation of the overall system starts. Here, each job that seizes job buffer capacity should keep within the seized limits irrespective of the fact that one or more jobs are carried out in parallel. To this end, the job buffer size used by one job is equal to the size of maximum data signal expansion that the job may have at any time in the job buffer:

$$\text{Max-available\_buffer\_capacity/number\_of\_pool\_users=distributed\_pool\_capacity\_per\_user} \quad (4)$$

This means that the total distributed capacity and the instantly available capacity could happen to ahve a potential of two times the maximum available capacity. With other words, the users with distributed capacity could have full pools of distributed capacity, i.e. all the pools together are equal to the maximum available capacity, at the same time as full (=maximum) available capacity is reassigned during a new sub-interval when no job is active.

In theory and practice, it could happen that this capacity will be seized by non-regular users at the same time as the regular users start using all of their distributed pool of capacity. Thus, the buffer capacity in use would in this case be two time the maximum available capacity used for regulation. But in the normal case the non-regular users would be submitted capacity sort of in between other jobs.

Another option would be to use the following equation:

Maximum available buffer capacity=(size used by functions with distributed pool capacity+size used by functions which request job buffer capacity when needed)/(maximum size used by a single job). (4-b)

As can be seen from equation (4), the maximum job buffer capacity for every sub-interval is evaluated to be the upper bound for buffer capacity that may be admitted during the following sub-interval. Further, according to the present invention, with every sub-interval the available job buffer capacity is calculated as follows:

Available capacity=(size used by functions with distributed capacity pool+size used by functions requesting job buffer capacity when needed−present buffer occupation)/(maximum size used by a single job). (5)

This equation (5) illustrates an important aspect of the present invention. In particular, the calculation of available job buffer capacity with every sub-interval allows to adapt the previous estimation to the actually existing presenting buffer occupation. The effect of this approach is shown in FIG. 10 where, e.g., line A corresponds to the estimate of available job buffer capacity for a sub-interval and the hatched area b corresponds to the actually used job buffer capacity in this sub-interval. As shown in FIG. 10 there may exist an over estimate that may be reassigned during the subsequent sub-interval. Thus, the dynamic adaptation of available job buffer capacity allows for increased utilization of available resources.

It should be noted that according to the invention job buffer capacity is not only reserved for functions requesting either a distributed pool of job buffer capacity when needed, but also for calls seizures and other events in the real-time communication system that are regulated after processor load. Further, job buffer capacities are provided also for non-regulated functions and usually this capacity is assumed to be equal to the one mentioned above for simplifying reasons. In practice it may depend on what the designed real-time communication system allows.

Still further there may be provided additional job buffer capacity (not shown) as safety capacity that is used intermittently up on regular normal and non-normal load peaks as additional reserve for the load regulation function executed by the load regulation unit 20.

In the following, the dynamic adaptation of available capacity or, in other words, the different steps of the window flow load control approach according to the invention will be described with respect to FIGS. 11 to 15.

Figure 11:
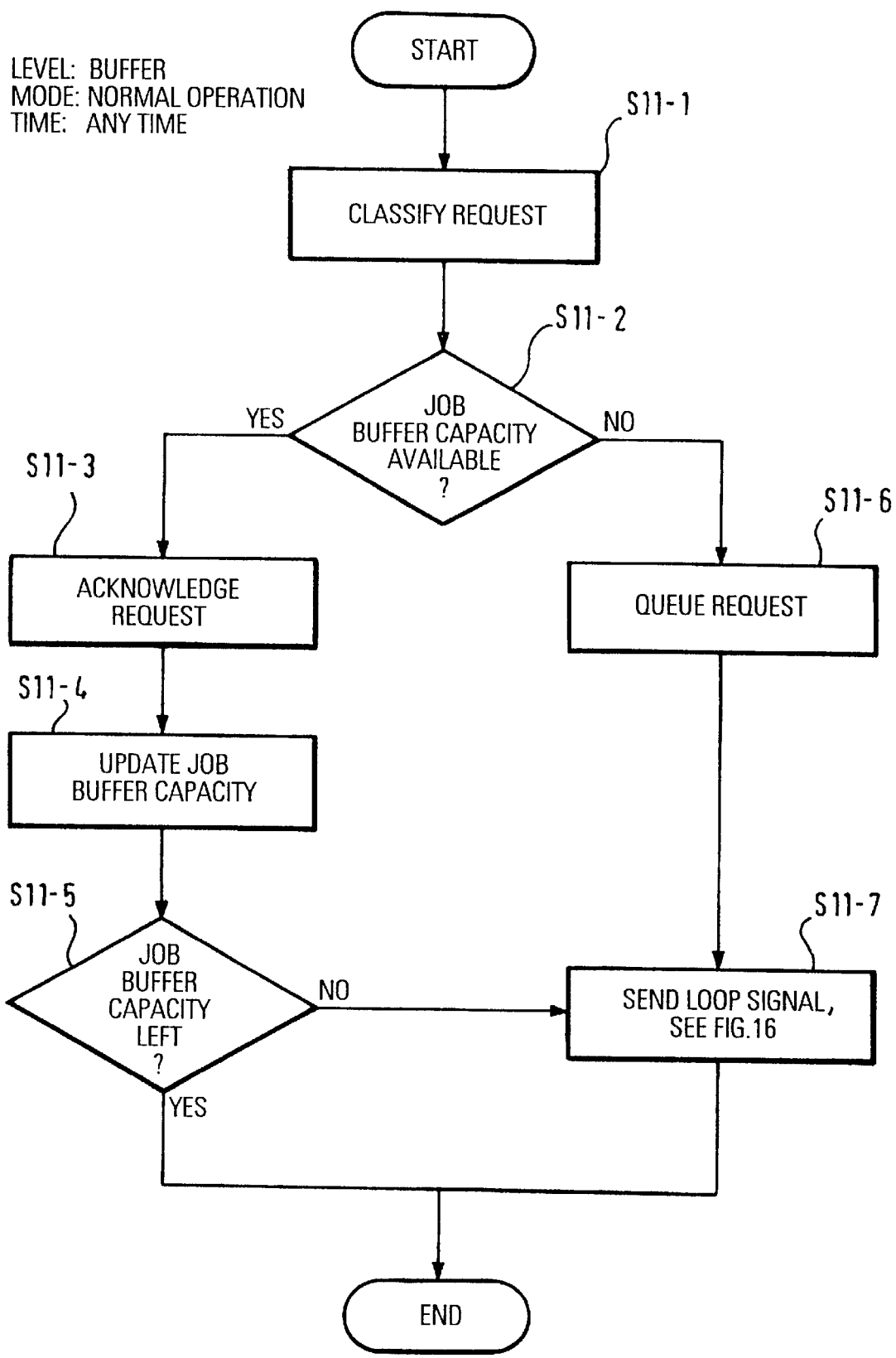
FIG. 11 shows an overview of the handling of requests during a sub-interval through the load regulation unit according to the invention.

As shown in FIG. 11, requests for job buffer capacity must be handled by the load regulation unit 20 according to the invention at any time within the sub-interval explained with respect to FIG. 10. In case such a request is transmitted to the load regulation unit 20, the first step S11-1 consists of classifying this request. The meaning of this step is that requests for job buffer capacity may be classified in two requests of the type "any available" and "all of requested":

Any available: This type of request is from a user that runs different single jobs which are not related to each other or can be executed independently. If the requested capacity is not available it can proceed with what can be submitted until more needs to be requested again. The users with distributed pool capacity are typically such users.

All of requested: Some users need a certain amount of capacity to execute a number of jobs related to each other. An example would be a PCM link with 32 individual connections for which some action must be taken. If, e.g., the PCM link must be taken out of service due to failure measures must be taken for all the 32 individual connections.

Another type of request could have particular high real time demand. If the capacity requested is not available for such a request it should not be queued but rejected by the load function.

To the contrary, in case the request is of the any available type, it will be acknowledged also in case the full requested job buffer capacity may not be available. Only in case no capacity is available at all the request will be put in a queue according to the job priority. Here, in case a job is put in a queue, any available job buffer capacity is blocked to force subsequent job requests also to be queued so as to keep job execution and priority order, e.g., a subsequent job requesting only minor job buffer capacity should not be allowed to be executed before a job with the same or higher priority that is put in a queue is assigned sufficient capacity.

In case also the queue of the job buffer being related to a specific request is filled up, the request for job buffer capacity will finally be rejected. It is then up to the user function to decide whether the job(s) should be internally queued within the user function or be discarded at all. However, jobs like, e.g., call disconnections of course must be queued.

Following the principles outlined above, FIG. 11 shows a more detailed representation of the sequence of different steps. After the classification of a request in step S11-1 it is determined in step S11-2 whether there is enough job buffer capacity available for the submitted request. In the affirmative case of the interrogation the request is acknowledged, step S11-3, and in the following the available job buffer capacity is recalculated according to formula (5), outlined above. Otherwise, in case it is determined in step S11-2 that there is not enough job buffer capacity available the respective request will be queued in step S11-6. Here, it should be noted that according to the state of the art the queuing of requests means that no further job buffer capacity is available and thus, no more jobs will be admitted to the job buffer until the end of the sub-interval.

Contrary to that, the present invention takes a completely different approach following the goal to resume the acceptance of submitted jobs as soon as job buffer capacities are available again. The basic idea underlying this approach that is illustrated in FIG. 10 is to set a reference mark called loop signal on a lower level priority as soon as no-more job buffer capacity is available on the higher priority level. Then the processing of jobs continues and eventually the processing will come to the lower level and get note of the loop signal previously stored on this priority level. On detection of this loop signal an acknowledgement will be given up to the higher priority level thus, returning processing to the higher priority level.

Here, the pre-requisite for the processing on the lower level has been that all jobs on the higher level have previously been executed, this means that on reception of the acknowledgement it is known on the higher level that full processor capacity is available again so that additional requests may be submitted on this level.

The major advantage of this approach is that the acceptance of further requests is not deferred until the end of the respective sub-interval but is made dependent on the actual load situation. This allows to significantly increase the acceptance rate for incoming job requests and thus also the effectiveness of the central unit. Further details with respect to the sending of loop signals will be explained in detail in the following with respect to FIG. 16.

As shown in FIG. 11, according to step 11-5 such a loop signal is also sent in case no job buffer capacity is left after the update of the job buffer capacity in step S11-4. The meaning of the step S11-5 is that the load regulation unit 20 according to the invention does not only await requests to be queued until the loop signal mechanism is initiated, but already carries out the respective steps as soon as the queuing of requests is to be expected.

Figure 12:
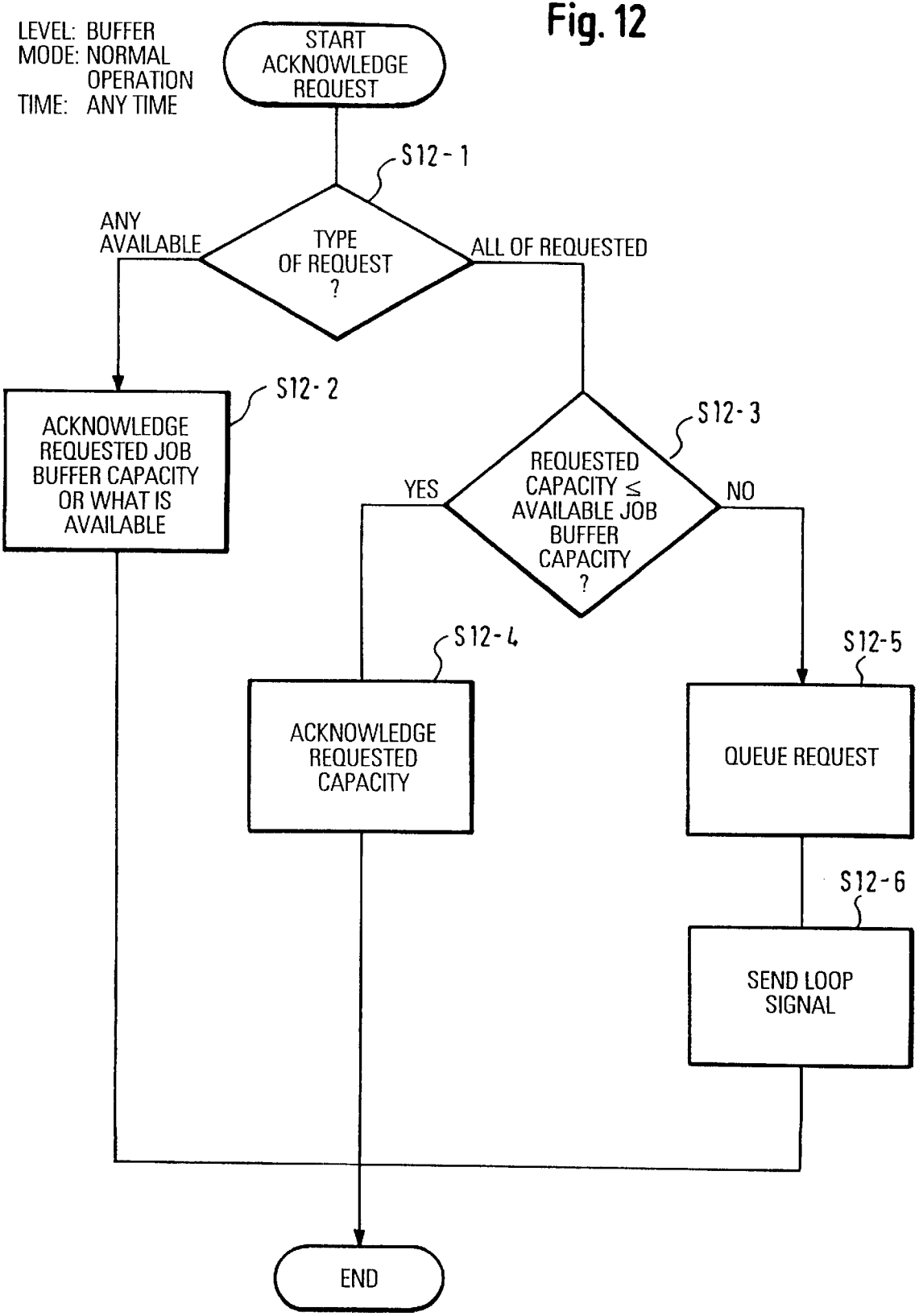
FIG. 12 shows an acknowledgement of a request during a sub-interval through the load regulation unit according to the invention.

FIG. 12 relates to the step S11-3 shown in FIG. 11, i.e. the acknowledgement of submitted requests. As already outlined above, in the beginning the type of request is interrogated in a step S11-1. In case the request is of the type of any available, the requested job buffer capacity or what is available is acknowledged in step S12-2 and the processing continues with step S11-4, as shown in FIG. 11.

Otherwise, that is in case the request is of the all of requested type, the requested capacity is compared to the available job buffer capacity in step S12-3. In case this interrogation is affirmative, the requested capacity is acknowledged in step S12-4 and then the processing again proceeds with step 11-4 shown in FIG. 11. Otherwise, the request of the all of requested type is queued in step S12-5 and afterwards a loop signal is sent to the lower level according to step S12-6. As outlined above, the sending of the loop signal in this step S12-6 allows to resume the submission of request as soon as full capacity is again available on the higher priority level as outlined above.

Figure 13:
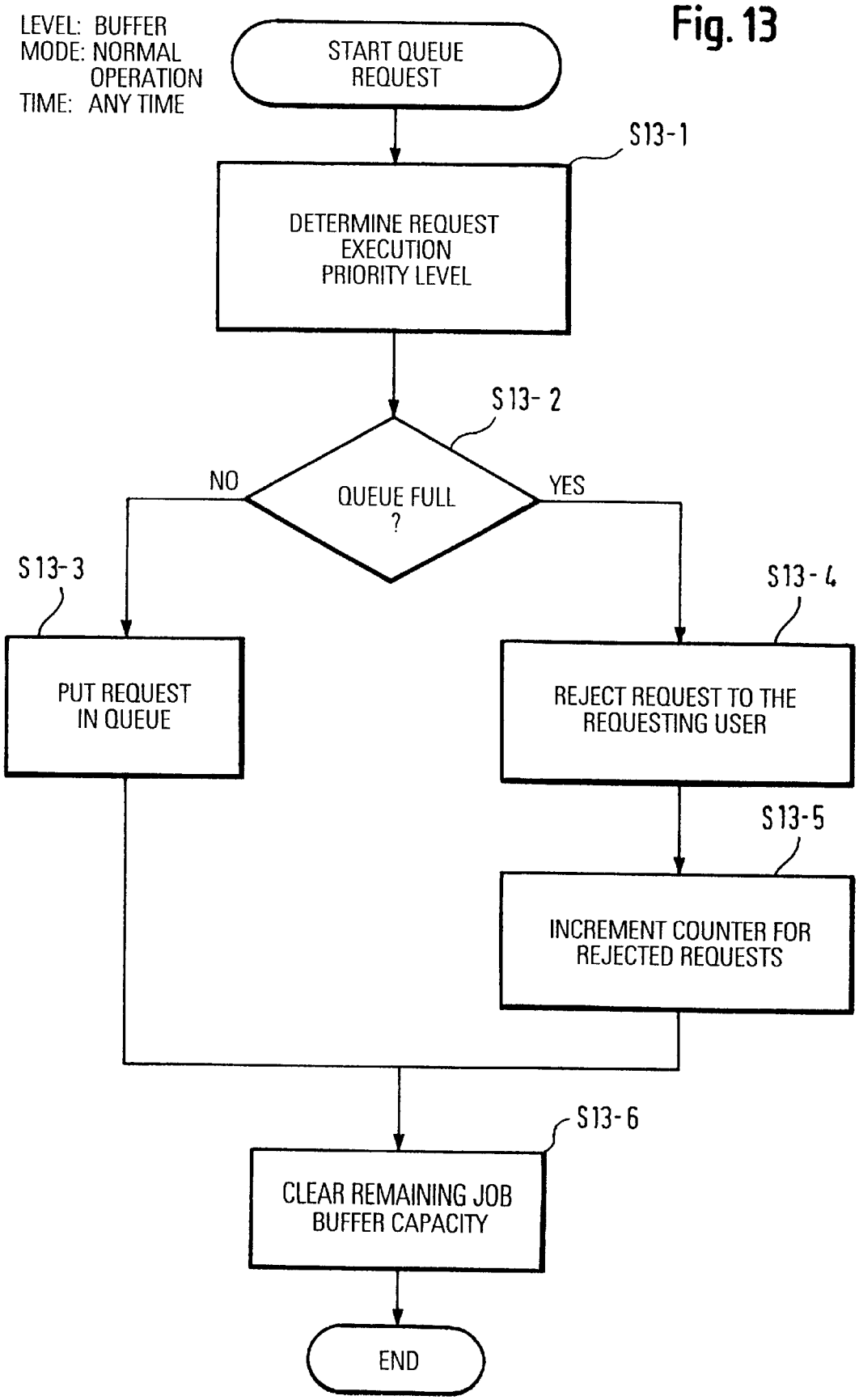
FIG. 13 shows the queuing of a request during a sub-interval through the load regulation unit according to the invention.

FIG. 13 shows details to queue a request according to step S11-6 shown in FIG. 11 and step S12-5 shown in FIG. 12.

Here, in step S13-1 the priority level of a request is initially determined. Then, in step S13-2 there follows the interrogation whether the queue of the respective priority level is filled up or not. If this is not the case, the request is put into the queue in step S13-3. Otherwise, the request is rejected to the requesting user in step S13-4 and in step S13-S a counter for rejected requests is incremented. Here, the count value may be used as indication of overload in the system. Finally, in step S13-6 the remaining job buffer capacity is cleared to avoid a situation where jobs requiring only a minor amount of job buffer capacity are allowed once after a previous job request has been rejected to the user.

Figure 14:
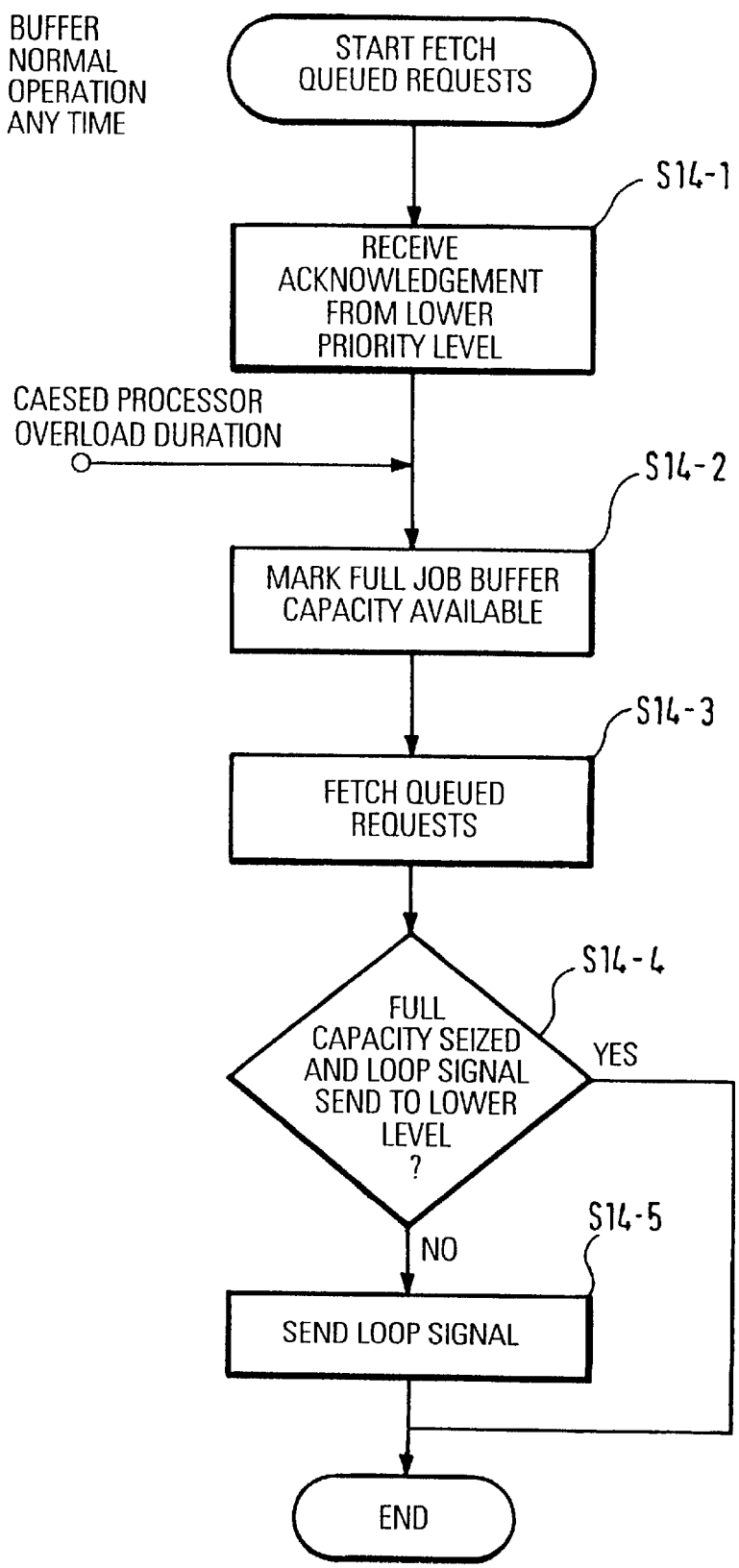
FIG. 14 shows the process of fetching queue requests during a sub-interval through the load regulation unit according to the invention.

FIG. 14 gives an overview of a situation where a request is not queued but fetched from a queue once job buffer capacity is available again on a certain priority level for execution. The function shown in FIG. 14 allows execution on a lower level or lower levels, respectively. In the later case it means that it has been necessary to stop execution on higher level due to either critical job buffer load or processor overload duration. In this case, executions are limited (stopped) on the highest levels and finished on other high level(s) before some execution is carried out on the lowest level. Then the processing returns to priority level where requests have been intermittently queued as shown in FIG. 14-1. Another case would be that a time period where the central processor 22 has operated under overload condition has ceased and that now processor capacity is available again for the further handling of requests. In both cases at the beginning there is set a reference in step S14-2 that now full job buffer capacity is available. Afterwards, queued requests are fetched to the available job buffer in step S14-3. In case capacity is seized an interrogation is carried out in step S14-4 to check on whether a loop signal indicating such full capacity seizure has been sent to the lower level or not. If this is not the case, such a signal will be sent in step S14-5.

Figure 15:
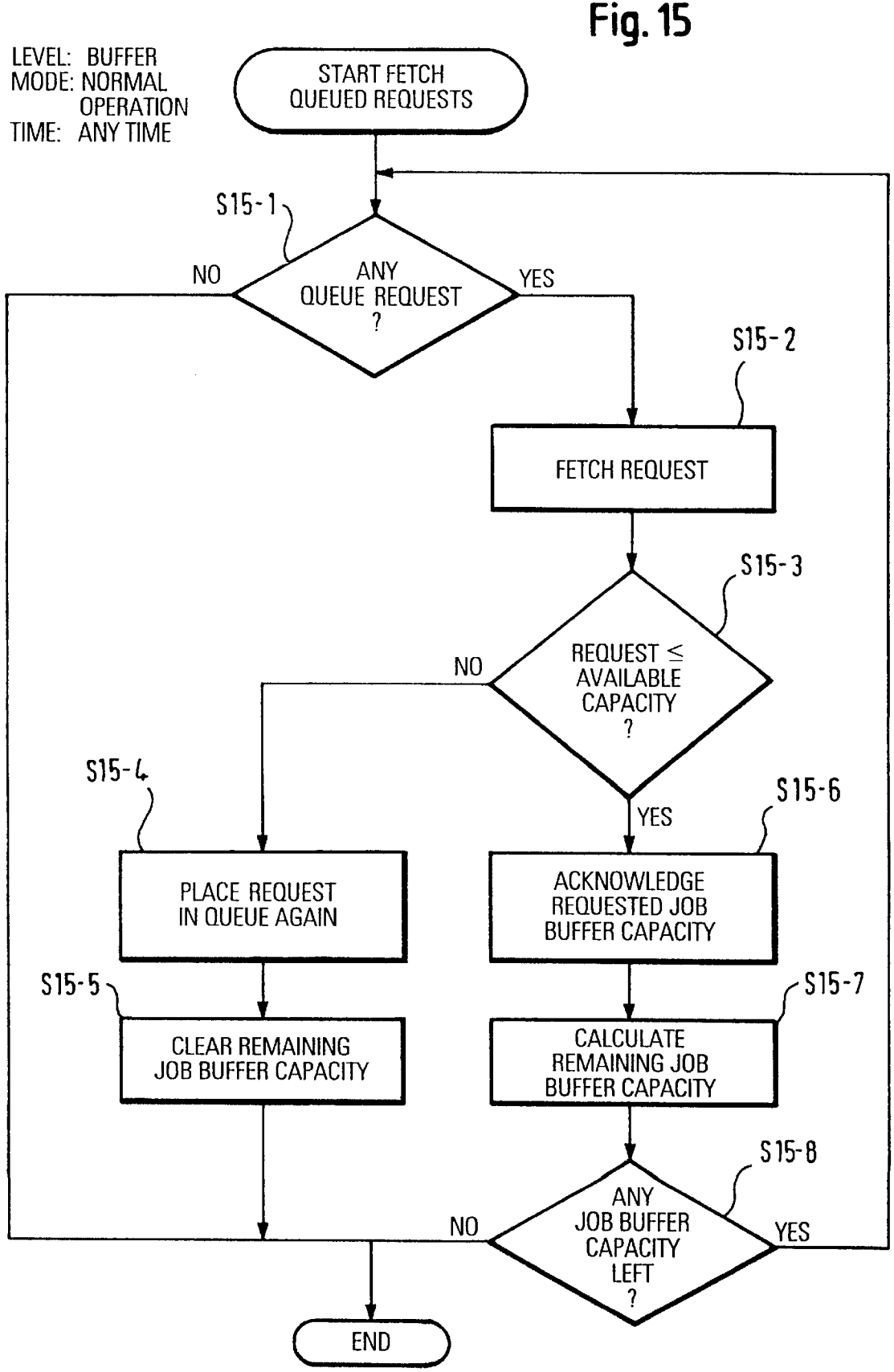
FIG. 15 shows a more detailed flow diagram of the process outlined in FIG. 14.

FIG. 15 shows further details of the step S14-3 to fetch queued requests. Initially, in step S15-1 it is checked on whether requests are queued at all or not. If this is the case a request is actually fetched from the queue in step S15-2 and then in step S15-3 the capacity necessary for this request is compared to the available capacity. In case the available capacity does not allow to place the request into the job buffer of the corresponding priority level, the fetched request will be placed again in the queue according to step S15-4. Further, the remaining job buffer capacity will be cleared in step S15-5 to avoid a further request being positioned in the job buffer as already outlined above.

On the other hand, if enough capacity is available for a fetched request this request will be acknowledged to the requesting user in step S15-6 and then the remaining available job buffer capacity will be calculated in step S15-7. Finally, in step S15-8 it is checked whether job buffer capacity is left or not. If this is not the case the fetching of queued request comes to an end. Otherwise, the flow returns back to step S15-1 to see whether additional requests are queued or not.

In the above, two important aspects of the invention have been described. The first is the dynamic adaptation of the available job buffer capacity to the currently seized job buffer capacity. As discussed with respect to FIG. 10, this allows to make optimum use of all available job buffer capacity. Further, this approach does not make a distinction between call requests and related requests such as call disconnections. This allows the central unit to be protected against previously uncontrolled overload situations resulting from, e.g., mass events. Further, the queuing mechanism explained with respect to FIGS. 13 to 15 shows that requests are not lost during a sub-interval as requests are queued and not immediately rejected in case there is not enough job buffer capacity available. This feature allows for significant performance enhancement of the central unit as queuing of request means that there processing may be resumed also during a sub-interval so that the requirement to wait for the beginning of another sub-interval and to resubmit those requests to the central processor 22 becomes obsolete. In other words, as soon as job buffer capacity is available again for queued requests they will be immediately transferred into the job buffer before the end of a regulation sub-interval so that they can be processed without further delay by the central processor 22.

FIG. 16 shows another basic mechanism underlying the present invention that serves to achieve a dynamic load control of the central processor 22. To explain this mechanism it is assumed that several job buffers are provided in the job buffer unit 16 and, e.g., the load regulation unit 20 is adapted to control the load on a higher level shown in the upper part of FIG. 16. Further, FIG. 16 shows on the left side the number of jobs active on the higher and lower level, respectively, and on the right side the amount of available job buffer capacity on the higher and lower level, respectively.

As shown in the left part of FIG. 16 and already outlined above, in case the load regulation unit 20 according to the invention handles a plurality of higher levels, the processing of requests is switched between different priority levels. Thus, in case the number of active jobs on the higher level eventually becomes zero, the processing will go down on the lower level according to the dotted line 32. Here, the processing will continue in dependence of the requests in the job buffer and eventually return to the higher level in case further requests are eventually received on this higher priority level.

The right part of FIG. 16 shows how—according to the present invention—this basic mechanism is exploited to achieve a dynamic load control of the central processor 22.

To this end, according to the present invention there is introduced the concepts of loop signal and acknowledgement already referred to above. Here, the relevant point of action during a sub-interval is the time te when the job buffer runs out of capacity. Usually, in such a situation no further requests will be admitted to the job buffer anyhow, so that only after the beginning of the next sub-interval will the normal processing on this higher priority level continue.

Contrary to that, according to the present invention a loop signal 34 is sent to the lower level and received in the job buffer of this lower level. As this loop signal 34 is only a reference it will only require a minor amount of the available job buffer capacity on the lower priority level as shown at 36 and 38 in the lower part of FIG. 16.

Further, as shown on the left side of FIG. 16 the processing then continues on the higher priority level until the number of jobs active eventually reaches a level of zero at time t0 and processing then continues on the lower priority level. As the processing continues on this lower priority level it will eventually handle the previously sent loop signal as shown at 38. When the loop signal is handled on the lower priority level at time ta it is thus clear that no jobs on the upper priority level are handled and consequently job buffer capacity is available on the higher priority level again. Then, any queued request may be fetched and acknowledged again as long as capacity remains and as outlined with respect to FIGS. 14 and 15. If there is more buffer capacity requested then what is available, the loop signal to the lower priority level is sent again.

Also, the implementation of the loop signal sent to a lower signal means that it is not received before eventual job(s) in the job buffer in question are received and executed. As jobs on lower priority levels do not have the same real time requirements and are also allowed longer execution that on higher level, this may eventually delay the return to the level sending the loop signal.

One further feature that could be implemented in the operation system is an interrupt signal from the lower level as soon as execution can start on this level, or allowing only a certain execution, e.g. 1 ms, before return and start of execution on the level subject for regulation. I.e., instead of awaiting the loop signal the operating system would handle the acknowledge. It could then of course be a combination of these approaches, e.g. the operating system acknowledge could be used for high priority capacity requests with high real time demand only. Other requests would have to wait for the loop signal before being executed, or the next sub-interval start when requests are fetched in order of priority and queuing within each priority group.

Overall, processing on the higher level may be resumed at time ta where the acknowledgement is received on the higher priority level. Here, time ta may lie well before the end of the sub-interval so that in an extreme case according to the invention the full processing capacity according to a complete sub-interval may be gained as the processing is not immediately stopped once the maximum capacity of a job buffer is hit in a time t1 during processing in a sub-interval.

Figure 17:
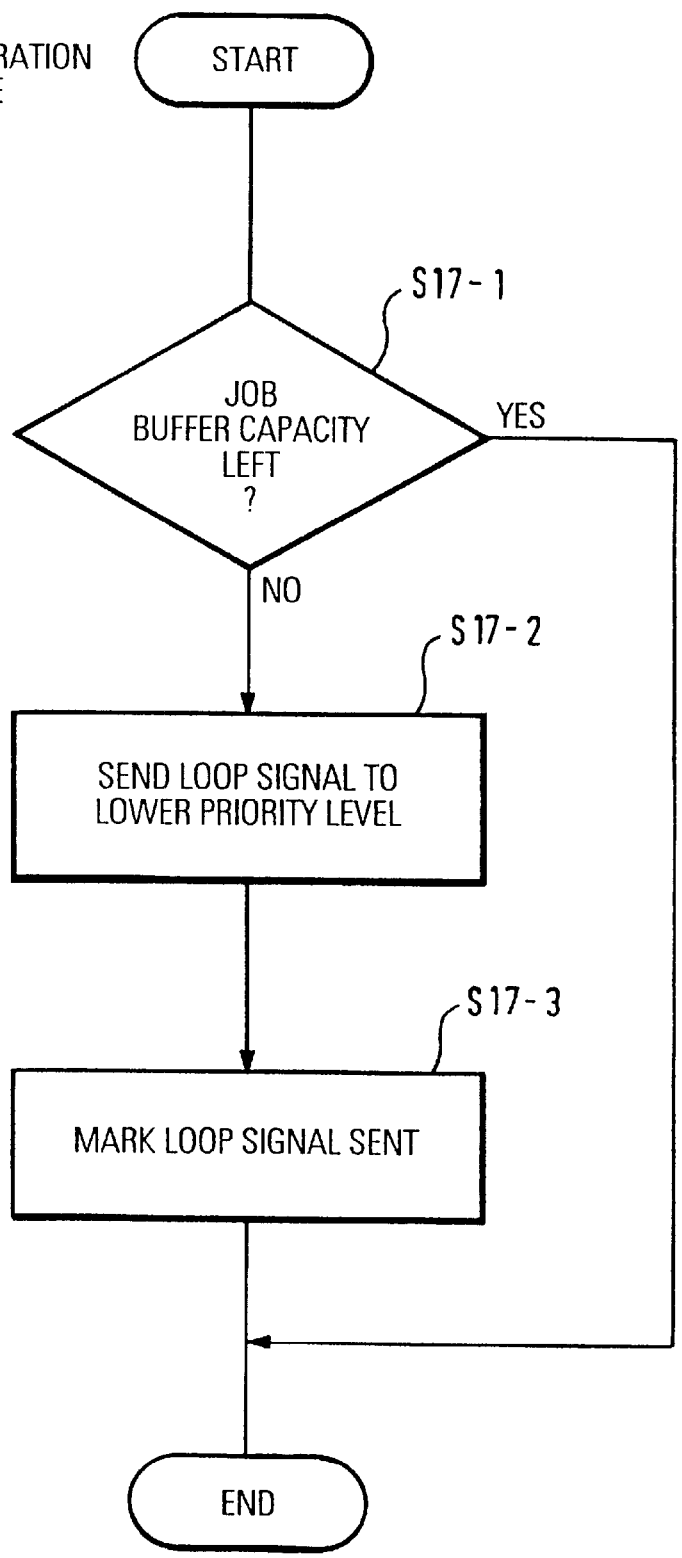
FIG. 17 shows a flow diagram according to the dynamic processor load regulation through the load regulation unit according to the invention.

FIG. 17 shows the major steps for the loop signalling mechanism according to the present invention. In step S17-1 there is executed an interrogation whether job buffer capacity is left or not. If this is not the case a loop signal is sent to the lower priority level according to step S17-2. Further, a mark indicating that a loop signal is sent will be set in step S17-3 that may be used as status indication later on.

Further, while the jobs submitted on the higher priority level have real-time requirements the duration of submitted jobs may also last over several sub-intervals depending on what the jobs are and what the current load situation is. Here, it could be that single jobs have not arrived at the predicted signal expansion, i.e. signal multiplication and/or data expansion, which job buffer capacity was provided for. According to the invention, this however does not construe a problem as the job buffer utilization is checked every sub-interval and any possible overstep of the number of submitted jobs should well be within margins accounted for, i.e. normal fluctuations. Nevertheless, if still some hazardous situations would occur, there are protections to cope therewith, for example on the operating system level as will be outlined in more detail below.

While the normal operation of the load regulation unit 20 according to the present invention has been described above with respect to FIGS. 9 to 17, in the following the focus will be on the step to prepare the next sub-interval according to step S8-4 shown in FIG. 8. This explanation will be given with respect to FIGS. 18 to 21.

Figure 18:
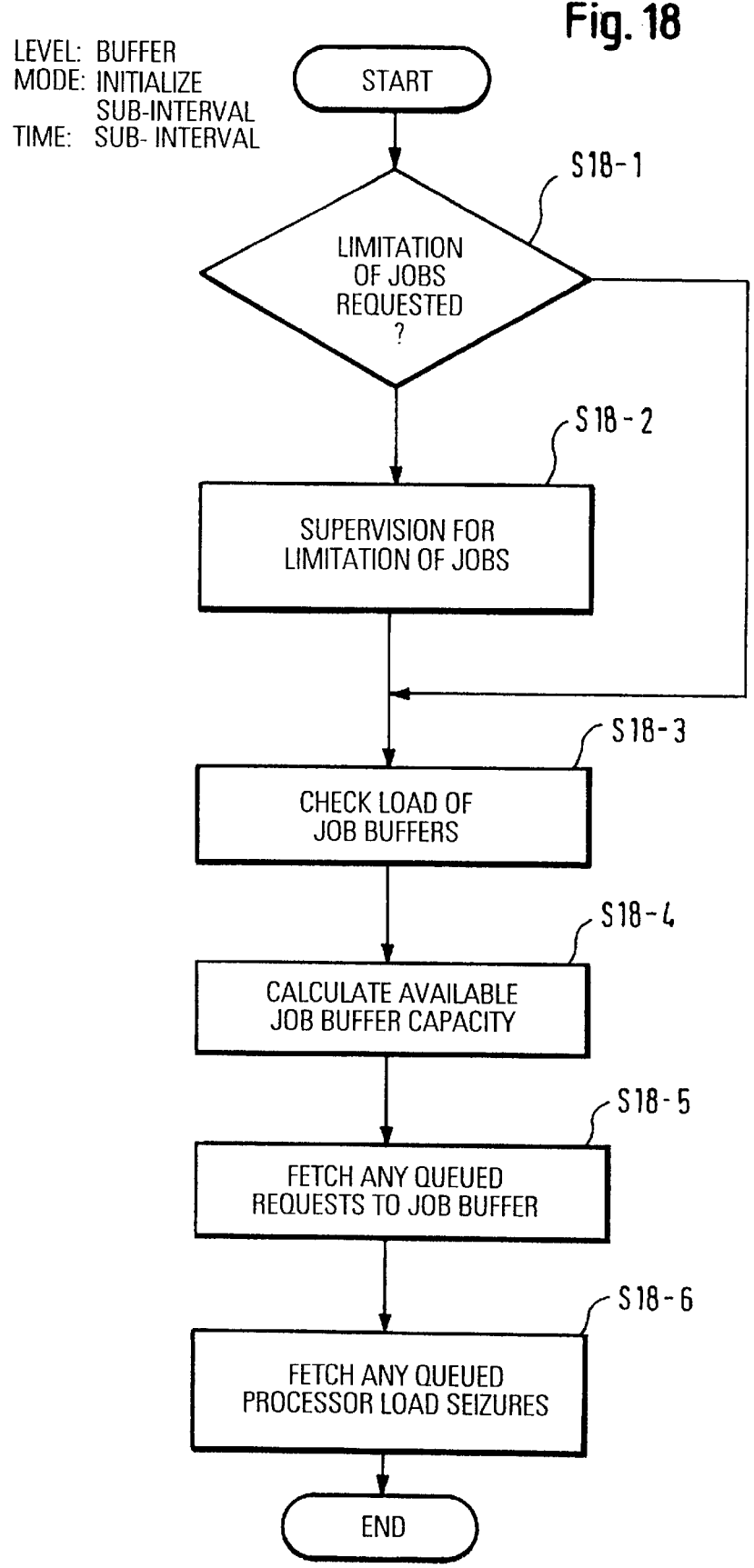
FIG. 18 shows the initialization steps for every sub-interval carried out by the load regulation unit according to the invention.

As shown in FIG. 18 the preparation of every sub-interval begins with an interrogation whether a limitation of jobs is requested by the controlling load function or not in step S18-1. If this is the case a supervision for limitation of jobs will be executed in step S18-2, which will be explained in more detailed with respect to FIG. 19. Otherwise, in step S18-3 a current load on the job buffer will be checked and the available job buffer capacity will be calculated using formula (5) outlined above in step S18-4. Finally, queued requests will be fetched to the job buffer in step S18-5 and then queued processor load seizures will be fetched in step S18-6.

Figure 19:
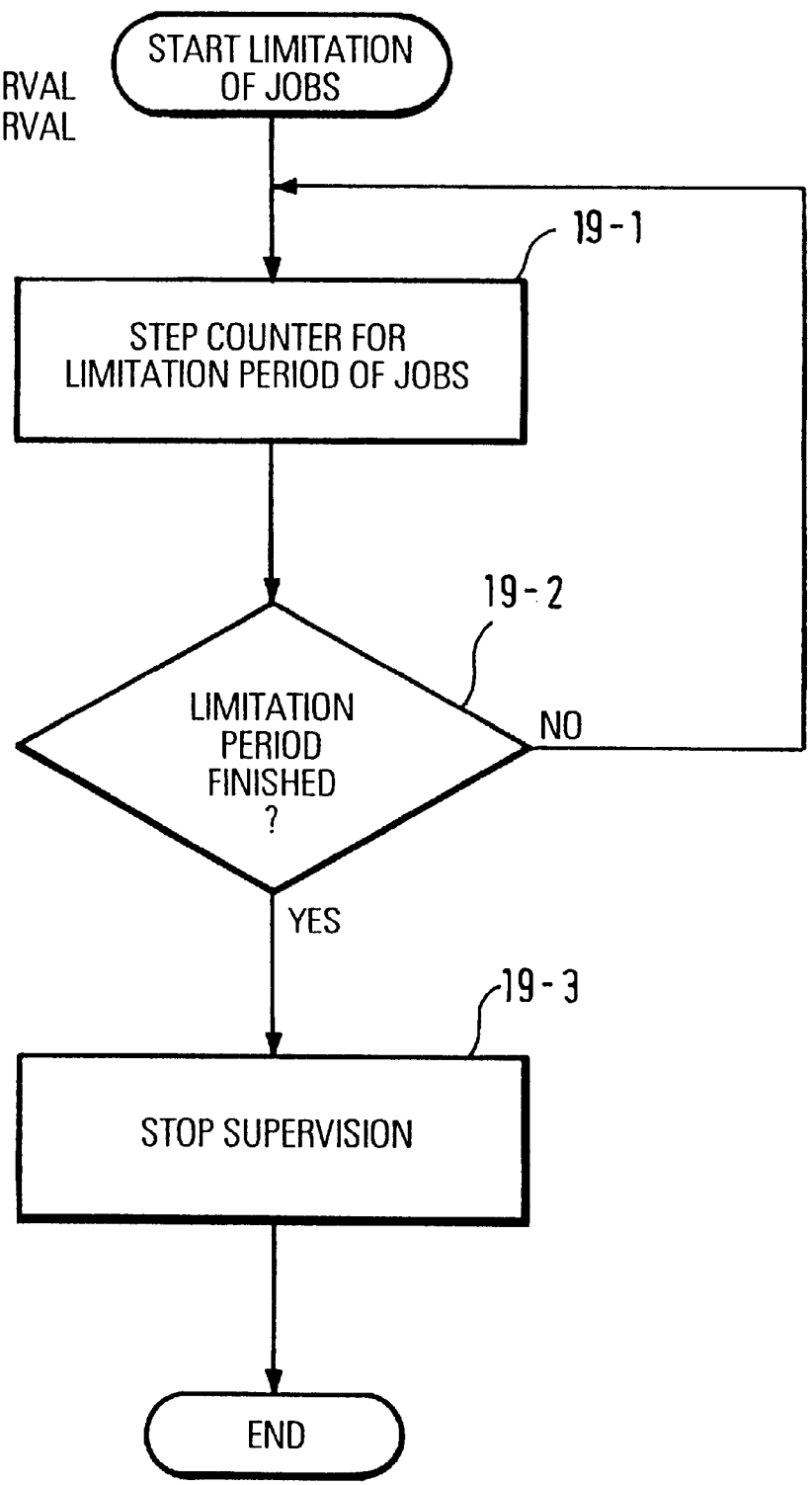
FIG. 19 shows a more detailed flow diagram for the limitation of jobs during initialization of a sub-interval according to FIG. 18.

FIG. 19 shows a flow chart according to the supervision or limitation of jobs referred to in step S18-2 of FIG. 18. As can be seen from FIG. 19, this supervision is basically carried out using a counter which is dynamically adapted to the number of submitted jobs in step S19-1. Further, in step S19-2 it is interrogated whether a period for job limitation has ceased or not and eventually in step S19-3 the supervision for limitation of jobs will be stopped. The job limitation period time must be defined on a system level. For example, if the limitation period is not enough, it must be determined how long stop is possible before some execution must be allowed.

Figure 20:
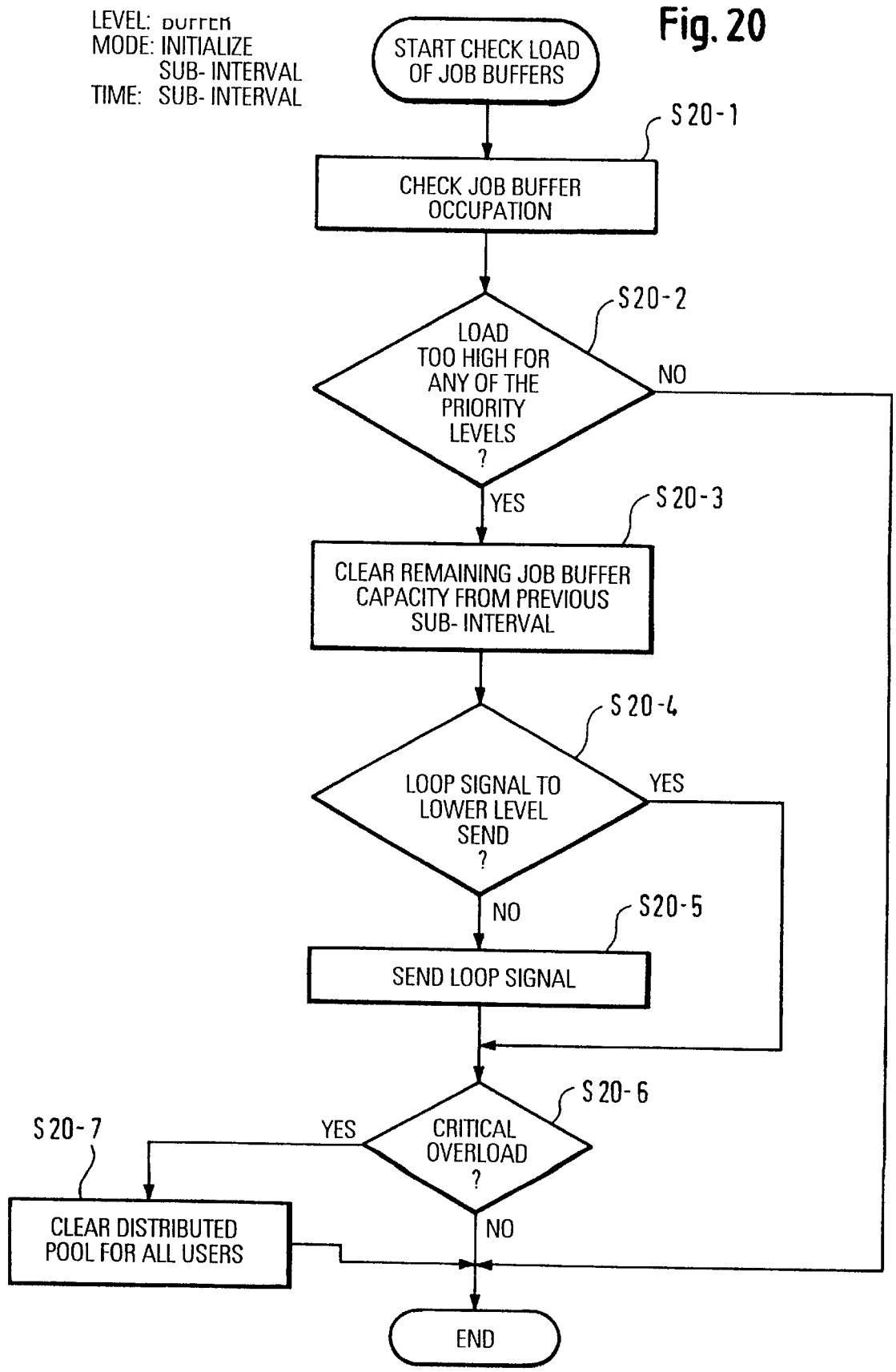
FIG. 20 shows the evaluation of job buffer loads during the initialization of a sub-interval according to FIG. 18.

FIG. 20 gives a further explanation of step S18-3 shown in FIG. 18, i.e. the check on the load of the job buffers. Here, initially the actual job buffer occupation is evaluated in step S20-1 and then there follows an interrogation whether the load is too high for any of the priority levels in step S20-2. If this is the case, the remaining job buffer capacity from the previous sub-interval will be cleared and then a loop signal will be sent to the lower priority level in steps S20-4 and S20-5 according to the principles outlined with respect to FIG. 116.

This means that the steps explained above for the dynamic control of processor load may also start at the very beginning of a sub-interval and not only be executed during the course of such a sub-interval as shown in FIG. 16. In addition, in step S20-6 it is interrogated whether the overload condition is a critical overload condition. If this is the case, preassigned job buffer capacity or, equivalently, distributed full capacity, will be cleared for all users. Overall, the sequence of processing steps shown in FIG. 20 allows to achieve a well-defined initial state at the beginning of a sub-interval so that the normal operation explained above will start on the basis of suitably determined boundary conditions.

Figure 21:
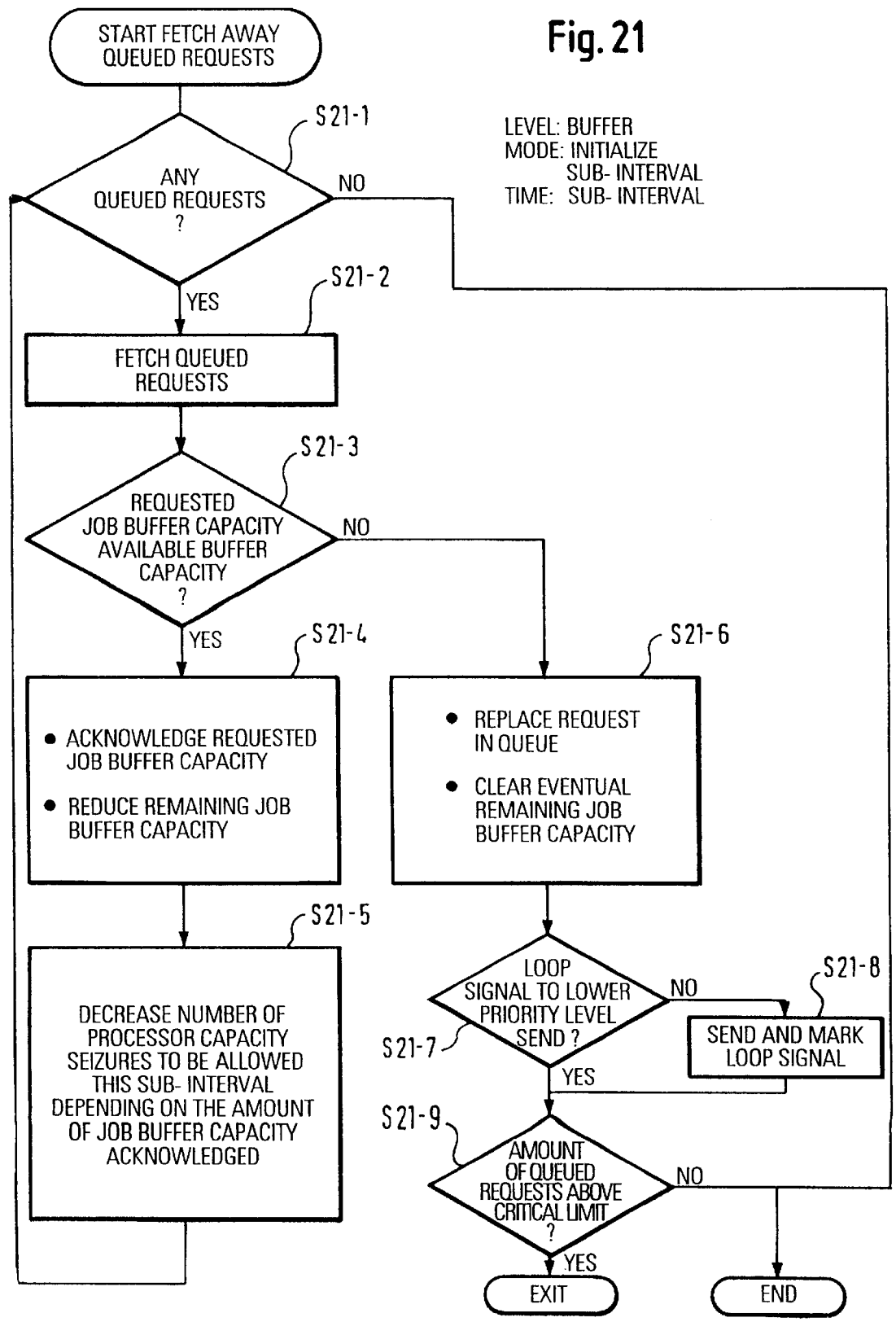
FIG. 21 shows the flow diagram of fetching queued requests during the initialization of a sub-interval according to FIG. 18.

FIG. 21 shows further details of step S18-5 of FIG. 18 and being related to the fetching of any queued requests to the job buffer at the beginning of every sub-interval. At the beginning, in step S21-1 it is determined whether any requests are queued at all and if this is the case these requests are fetched in step S21-2. Then, in step S21-3 it is interrogated, whether the requested job buffer capacity is lower or equal to the available job buffer capacity. If this is the case, in step S21-4 the requested job buffer capacity is acknowledged and the remaining job buffer capacity is reduced according to the principles outlined above and according to equation (5). Further, in step S21-5 the number of processor capacities seizures to be allowed during this sub-interval is decreased depending on the amount of job buffer capacity acknowledged.

However, if in step S21-3 it is determined that the requested job buffer capacity is larger than the available job buffer capacity, in step S21-6 the request will be replaced in the corresponding queue and eventually remaining job buffer capacity will be cleared. In addition, the loop signal sending mechanism according to the present invention and as already explained above, is executed in steps S21-7 and S21-8. Here, in case the amount of queued requests is above a critical limit the initialization routine will carry out an exit step. No user will be submitted job buffer capacity if there is none left. Nor will any processor load request be submitted if there are many job buffer requests queued up. Not until the load situation ceases or possibly until next sub-interval will any new jobs be submitted.

In the above, all steps involved during load regulation by the load regulation unit 20 according to the present invention have been explained with respect to FIGS. 8 to 21. However, as will be shown in the following the load regulation unit 20 is not only restricted to the control of operation of the job buffer unit 16, but also has an impact on the operation of the central processor 22.

Here, at processor overload, that is in case the duration of job execution on higher priority levels is too long, the load regulation unit 20 may also function to limit the execution of jobs by the central processor 22. Further, also the lowest priority level may be supervised in order to detect any critical delay of execution. Thus it is possible to reduce or stop the execution of jobs on higher priority levels momentarily. Thus, it is possible to cut down on the execution rate on higher priority levels in order to allow execution of jobs on lower priority levels in critical overload situations.

Figure 22:
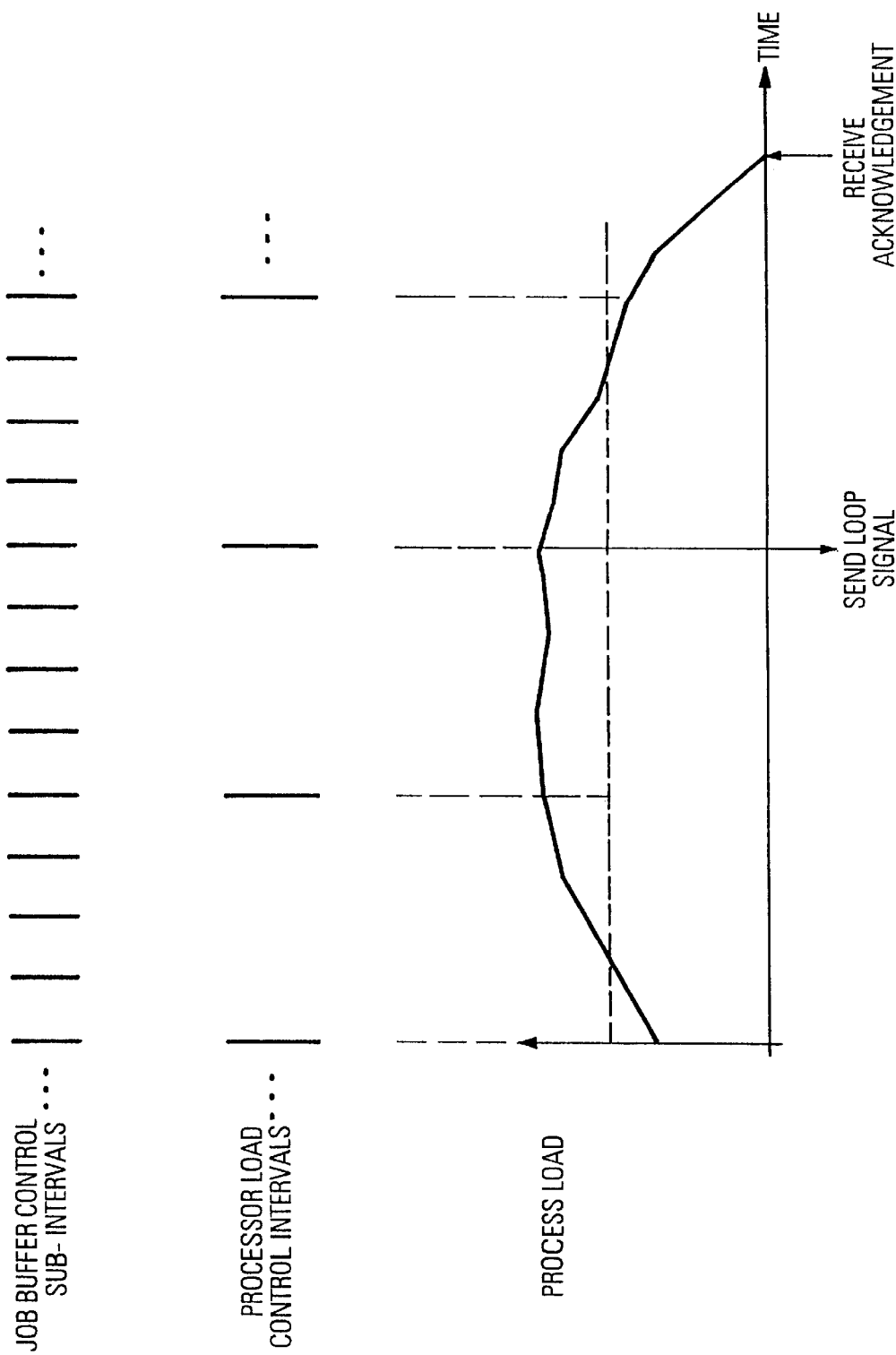
FIG. 22 shows an example for the regulation of a processor load through the load regulation unit according to the invention.

FIG. 22 shows details of such a processor load regulation. In the above, the usual sub-intervals for job buffer control are shown. As shown in FIG. 22, processor load regulation is carried out on another time scale, e.g., every 100 milliseconds if, e.g., the sub-interval has a duration of 40 milliseconds. Further, the processor load regulation is achieved by modifying the number of messages fetched during each sub-interval, i.e. the message processing rate.

Here, the load regulation unit 20 requests every, e.g., 100 milliseconds the value of the processor load over the previous processor load control interval and uses the load value to calculate an average measure load value over a longer period of time, so-called load supervision interval. At the end of each long period of time the load regulation unit 20 calculates the average load from the average measured load and the average load in the previous longer period of time. If the average load is above the target processor load limit that is defined by a parameter, the message processing rate is decreased for the next longer period of time. Here, the new message processing rate is set equal to the average number of fetched messages per second during the last longer period of time decreased according to the following formula:

$$MPR = A*(1-0,01) \quad (6)$$

where A is the average number of messages fetched during the last longer period of time.

If the processor load is between the lower and the upper processor load limit the message processing rate is not changed. Finally, if the average load is below the lower processor load limit the message processing rate will be increased according to the formula:

$$MPR = MPR + \text{Max}\left[1, \frac{(100-AL)*MPR}{660}\right] \quad (7)$$

where AL is the average load.

Also, there is a maximum value and a minimum value for the message processing rate. The maximum value is such that it has no limiting effect in normal load situations. Further, the minimum value is used to control the amount of processor capacity reserved for message processing. Therefore, in situations of heavy load resulting from high operation and maintenance activity, a minimum of throughput may be assured.

As shown in FIG. 22, the basic mechanism for processor load regulation outlined above is interleaved with the job buffer regulation using again the loop signal sending mechanism according to the present invention. Here, at the beginning of a processor load control interval a loop signal may be sent to the lower priority level to indicate the start of supervision of processor load. Then, the processing of jobs is continued on the higher priority level and eventually an acknowledgement of this loop signal will again be received from the lower (lowest) priority level. At this time the supervision of processor overload duration will be cleared since the transition to lower priority levels indicates an end of the overload duration.

Figure 23:
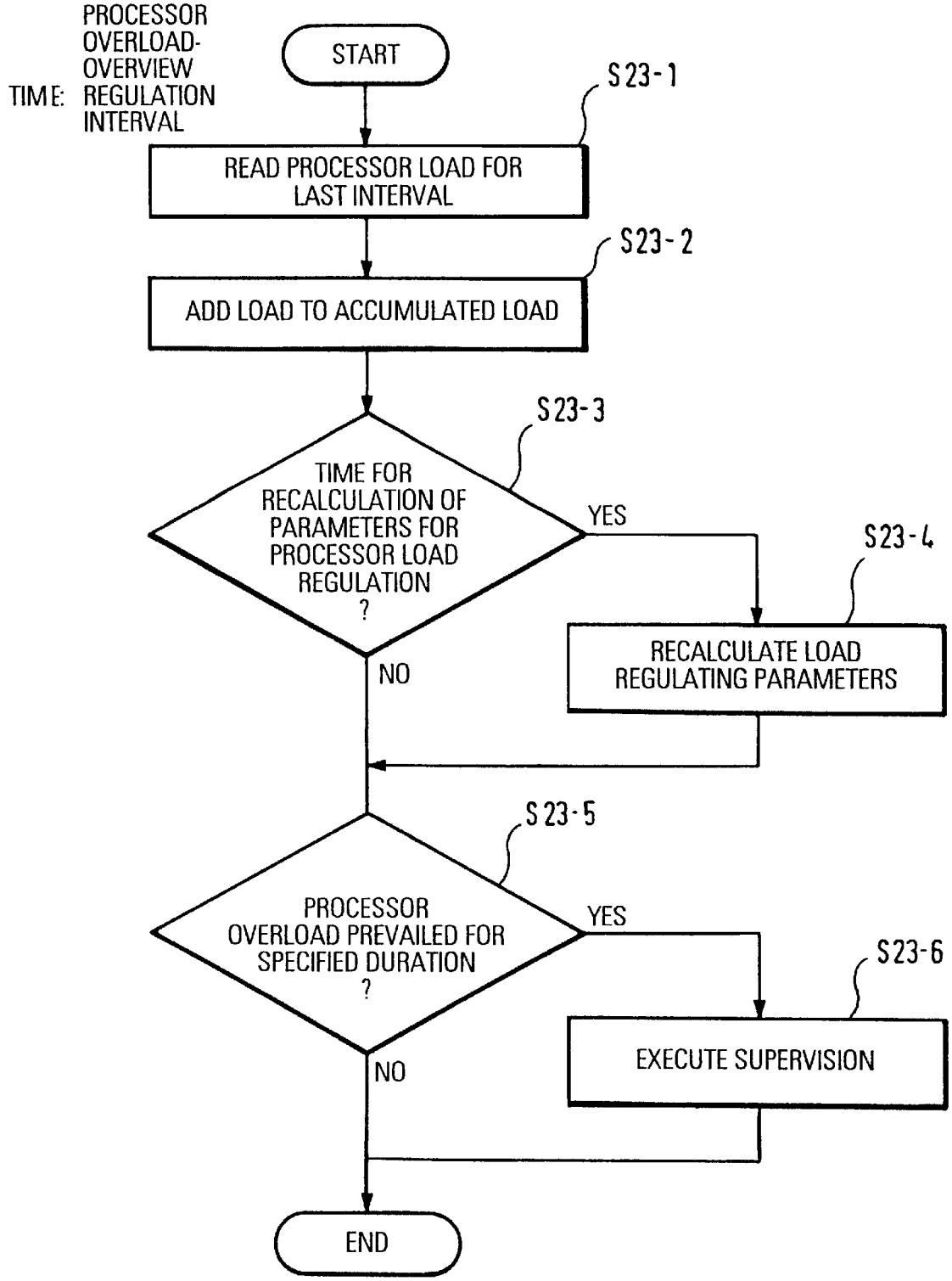
FIG. 23 shows a flow diagram for the regulation of the processor load according to the principle outlined in FIG. 22.

FIG. 23 gives a more detailed overview of the supervision of processor overflow. In step S23-1, firstly, the processor load for the last processor load control interval will be read. Then, this load will be added to the accumulated load in step S23-2. Further, in step S23-3 an interrogation takes place whether the time to recalculate the parameters for processor load regulation has ceased. If this is the case, the processor load regulating parameters are recalculated using formulas (6) and (7), specified above. Otherwise, the procedure immediately proceeds to step S23-5 corresponding to an interrogation whether the processor overload has prevailed for a pre-specified duration. If this is true, in step S23-6 the execution of supervision takes place.

Figure 24:
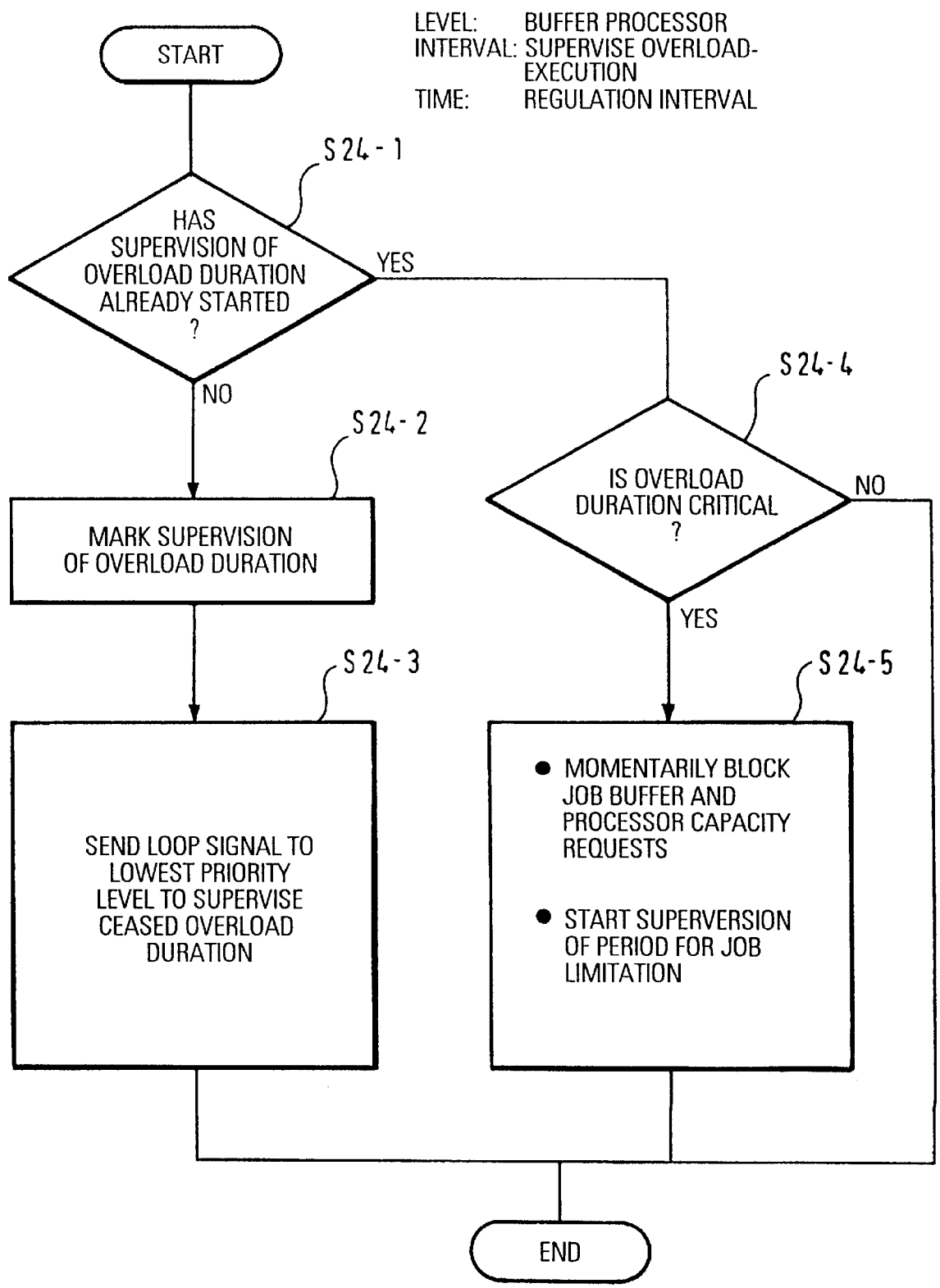
FIG. 24 shows a more detailed flow diagram for the supervision of processor load outlined in FIG. 23.

FIG. 24 explains the execution of the supervision according to step S23-6 on a more detailed level. Initially, in step S24-1 it is checked whether supervision of overload duration has already started. If this is not the case, a reference mark according to supervision of overload duration is set in step S24-2 and then a loop signal is sent to a lower or the lowest priority level in step S24-3 to supervise ceased overload duration. It the interrogation in step S24-1 shows that the supervision of overload duration has already started, an additional interrogation is carried out in step S24-4 to determine whether the overload duration is critical. If this is the case, immediate reaction is initiated in step S24-5. In particular, job buffer and processor capacity requests are blocked momentarily and the start of a supervision for job limitation is initiated.

Figure 25:
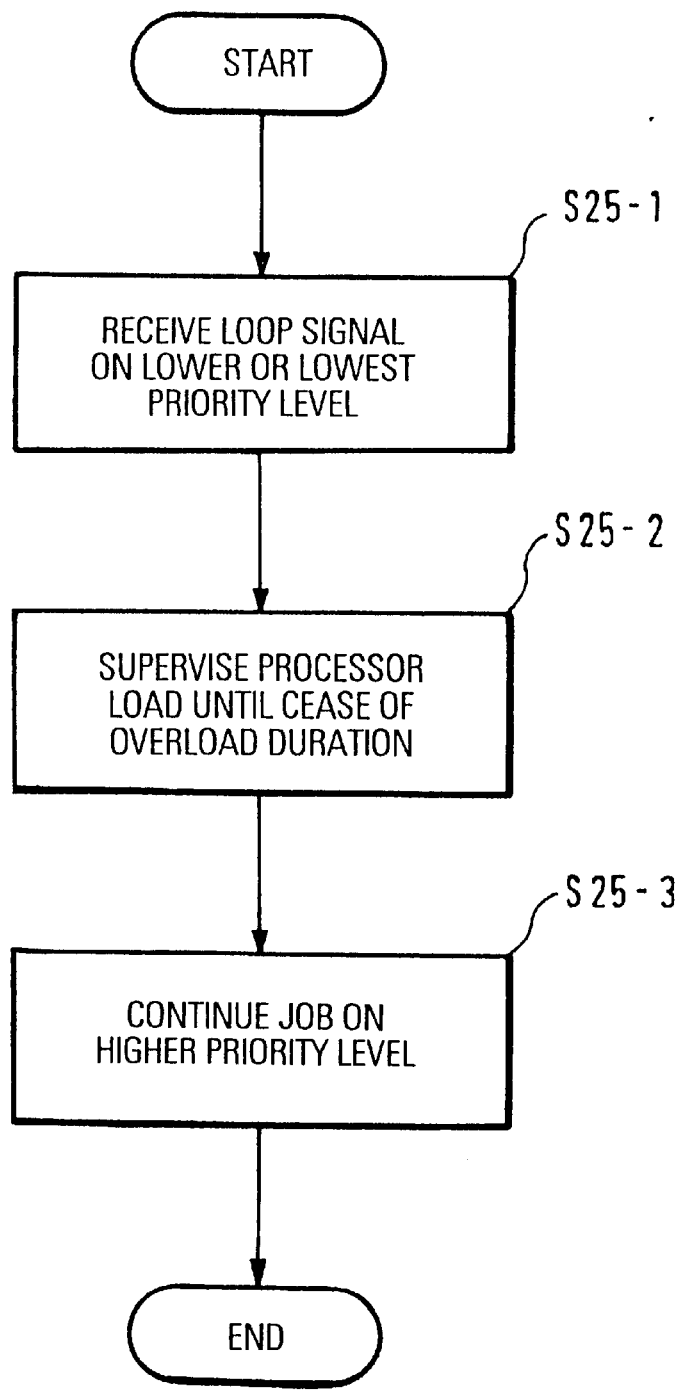
FIG. 25 shows an overview of the coupling between the supervision of processor overload and the job buffer capacity regulation.

As shown in FIGS. 22 and 25, the coupling of the processor overload supervision and the job buffer capacity regulation is also based on the loop signal sending mechanism according to the present invention and comprises three steps, reception of loop signal on lower or lowest priority level, step S25-1, supervision of processor load until ceased of overload duration, step S25-2, and continuation of jobs on higher priority levels, step 25-3.

Overall, the job buffer capacity regulation interacts with the processor load regulation, i.e. according to the present invention previously not regulated functions interact with each other in order to keep control of the job buffer load situation.

Figure 26:
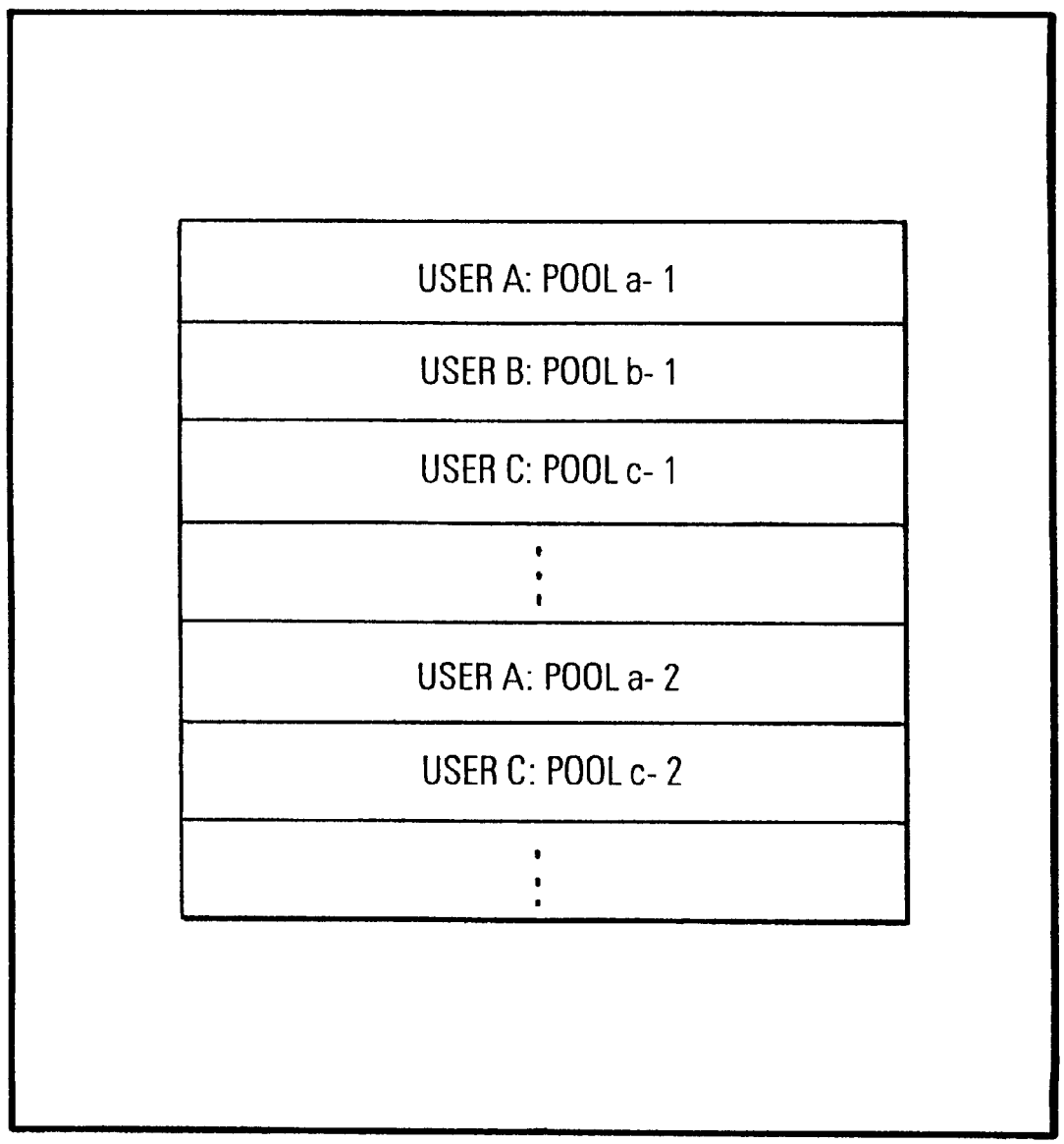
FIG. 26 shows a sub-division of an available job buffer capacity into a plurality of users pools.

The last aspect of the invention covers the start phase of the central unit at the very beginning of the operation thereof. At the start-up of the central unit shown in FIG. 6 the user has the option to specify the kind of job buffer utilization. One such preferred utilization according to the invention is shown in FIG. 26 and related to distributed job buffer capacity pools.

Here, according to the invention use is made of the fact that there are two main types of user functions that request for job buffer capacity, i.e. user functions with non-regular requests for job buffer capacity and user functions with regular requests for job buffer capacity. The former may be, e.g., a maintenance function which requests job buffer capacity and use this job buffer capacity at each particular event when it is needed. The later functions are user functions that execute specific jobs like, e.g., call disconnections permanently. These user functions request a certain amount of job buffer capacity that may not be used directly but only as it is needed. Here, in case all job buffer capacity like pool A-1 for user A is used, a new request pool A-2 for the same user A is requested and assigned thereto. This type of user function will be referred to as having a pool of distributed job buffer capacity.

Thus, according to the invention the possibility to distribute job buffer capacity will minimize the overhead load. The size of the distributed job buffer capacity which a user function may request depends on the number of user functions. However, it may also be necessary to limit the size of this distributed job buffer capacity to a maximum value depending on the application. Further, the feature of distributed job buffer capacity also means that the total capacity in use has a potential of two times the maximum available capacity, i.e. maximum available capacity that may be seized plus maximum available capacity distributed. Clearly, this is not a problem, but the central unit must be adapted to this option.

Further, in order to obtain total control of the number of jobs and the priority levels of these jobs at critical system events, the load regulation unit 20 according to the invention should be able to clear all this job buffer capacity distributed to the user, as outlined above. This is to prevent that the distributed job buffer capacity is used and will increase any potential overload situation and also to force the user functions to request new capacity.

Figure 27:
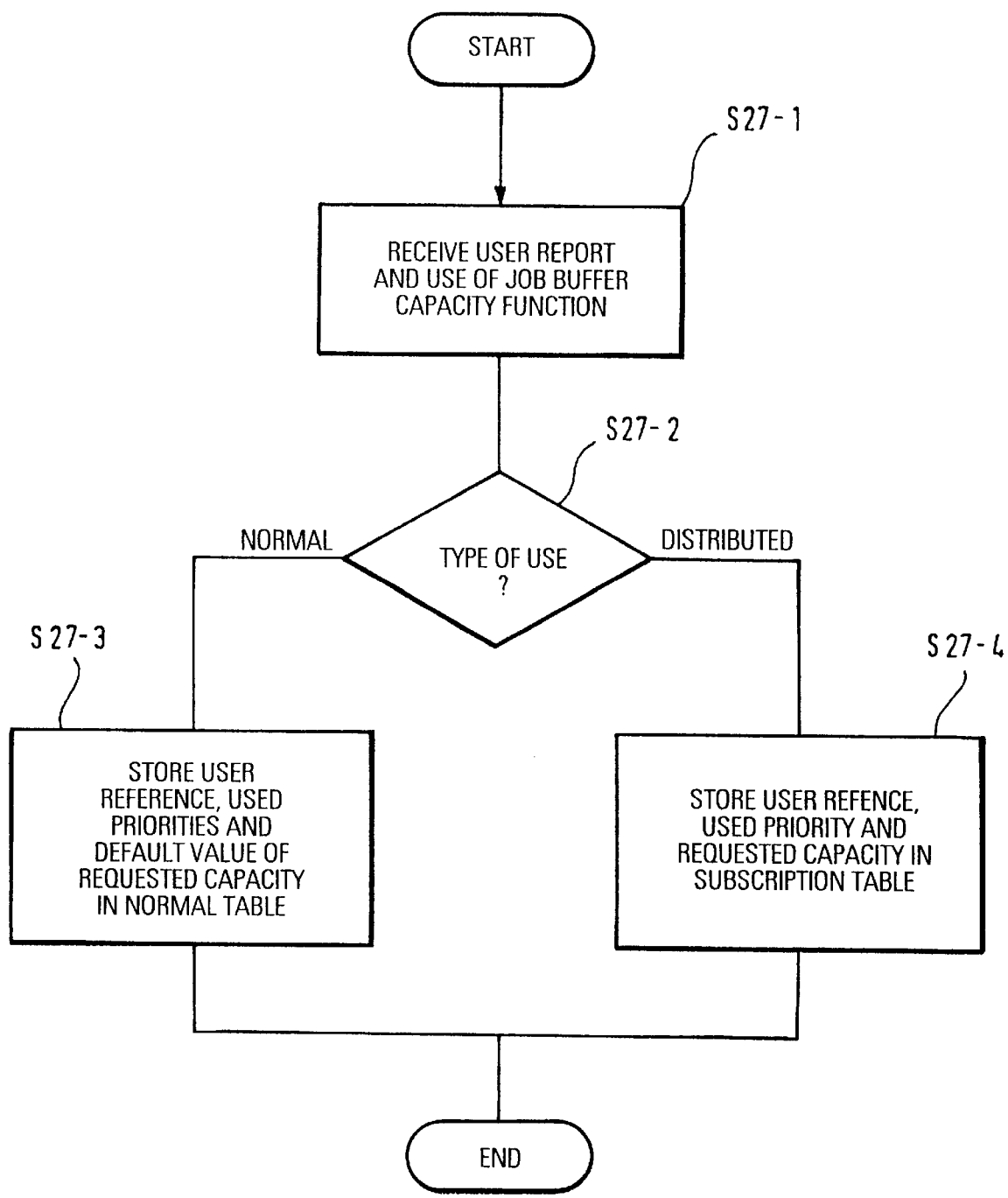
FIG. 27 shows initialization of the job buffer configuration during system start-up.

FIG. 27 shows further details for the processing during the system start-up phase. In a first step S27-1 user reports on the user job buffer capacity function are received. Then, in step S27-2 an interrogation is carried out to specify the type of job buffer capacity utilization, i.e. normal or distributed utilization, respectively. In the first case, in step S27-3 the user reference is stored and used priorities and default values for required capacities are stored in a normal table (not shown). In the second case, in step S27-4, too, user references are stored and user priority levels as well as required job buffer capacities are stored in a subscription table (not shown)

Figure 28:
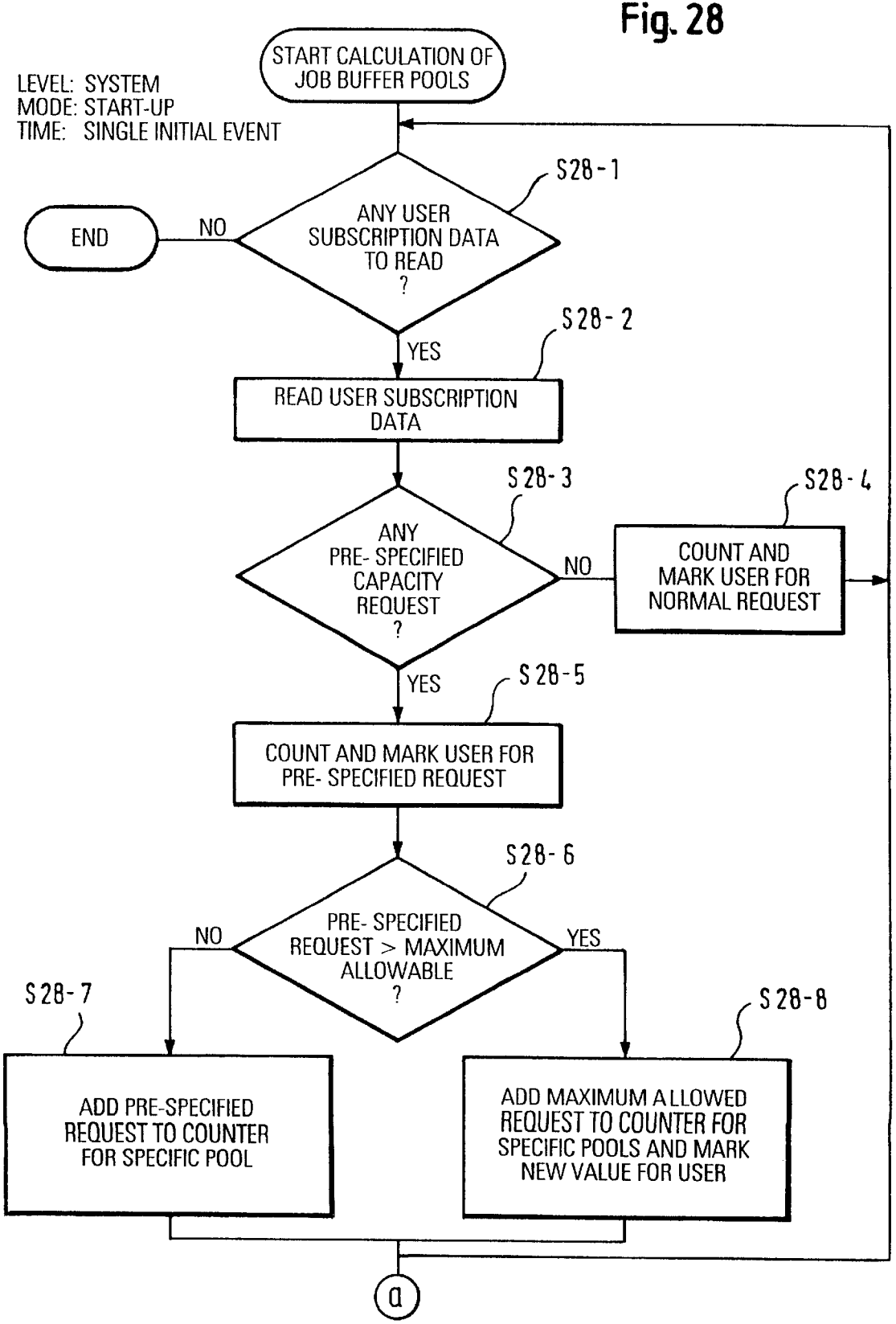
FIG. 28 shows a more detailed flow diagram for the calculation of user specific job buffer pools.

Further, FIG. 28 relates to the calculation of job buffer pools. Here, in step S28-1 it is initially checked whether any user subscription data has been read. If this is not the case, the calculation of job buffer pools will come to an end. Otherwise, the user subscription data is read in step S28-2 and then it is checked in step S28-3 whether any specified capacity request prevail. If this is not the case, the user is accounted and marked for normal requests in step S28-4 and the procedure returns to step S28-1. Otherwise, the user is accounted and marked for pre-specified requests. Then, in step S28-6 it is checked whether the pre-specified request is larger than the maximum allowable pre-specified request. If this is not the case, the pre-specified request is added to the counter for specific pools in step S28-7. Otherwise, the maximum allowable pre-specified request is added to the counter for specific pools and a new value is marked for the corresponding user. Also, an alarm will be initialized to indicate that the pre-specified request exceeds the maximum allowable upper border.

Figure 29:
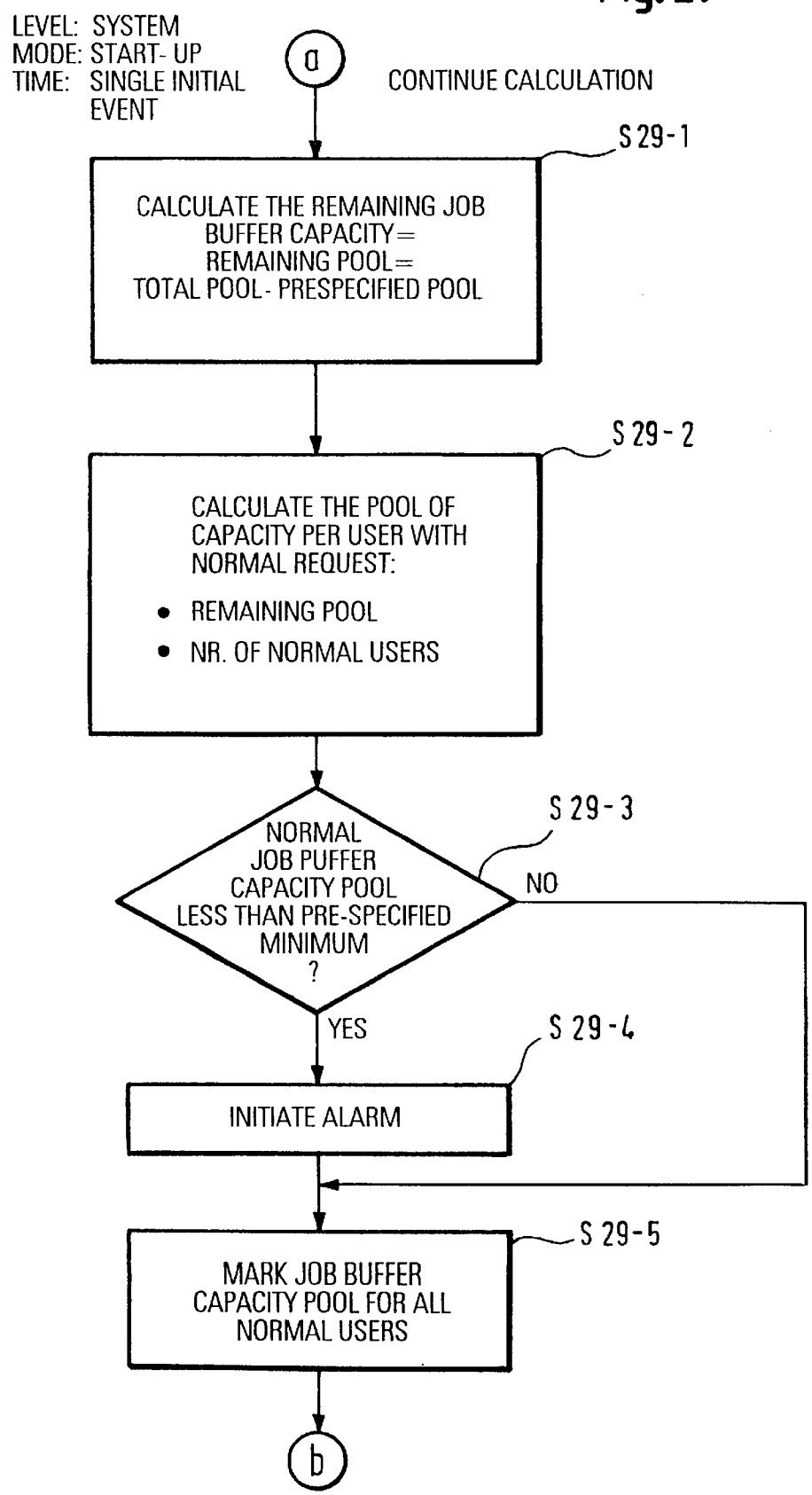
FIG. 29 shows the continuation of the calculation according to FIG. 28.

FIG. 29 relates to the continuation of calculation of job buffer pools according to FIG. 28. Here, in step S29-1 the remaining job buffer capacity is calculated according to remaining pool=total pool—pre-specified pool.

Then, in step S29-2 the calculation of pool capacity per user with normal requests is determined on the basis of the remaining pool and the number of users. Afterwards, in step S29-3 an interrogation takes place whether the normal job buffer capacity pool is less than a pre-specified minimum. If yes, an alarm will be initiated in step S29-4. Afterwards, the job buffer capacity pool will be marked for all normal users in step S29-5.

Figure 30:
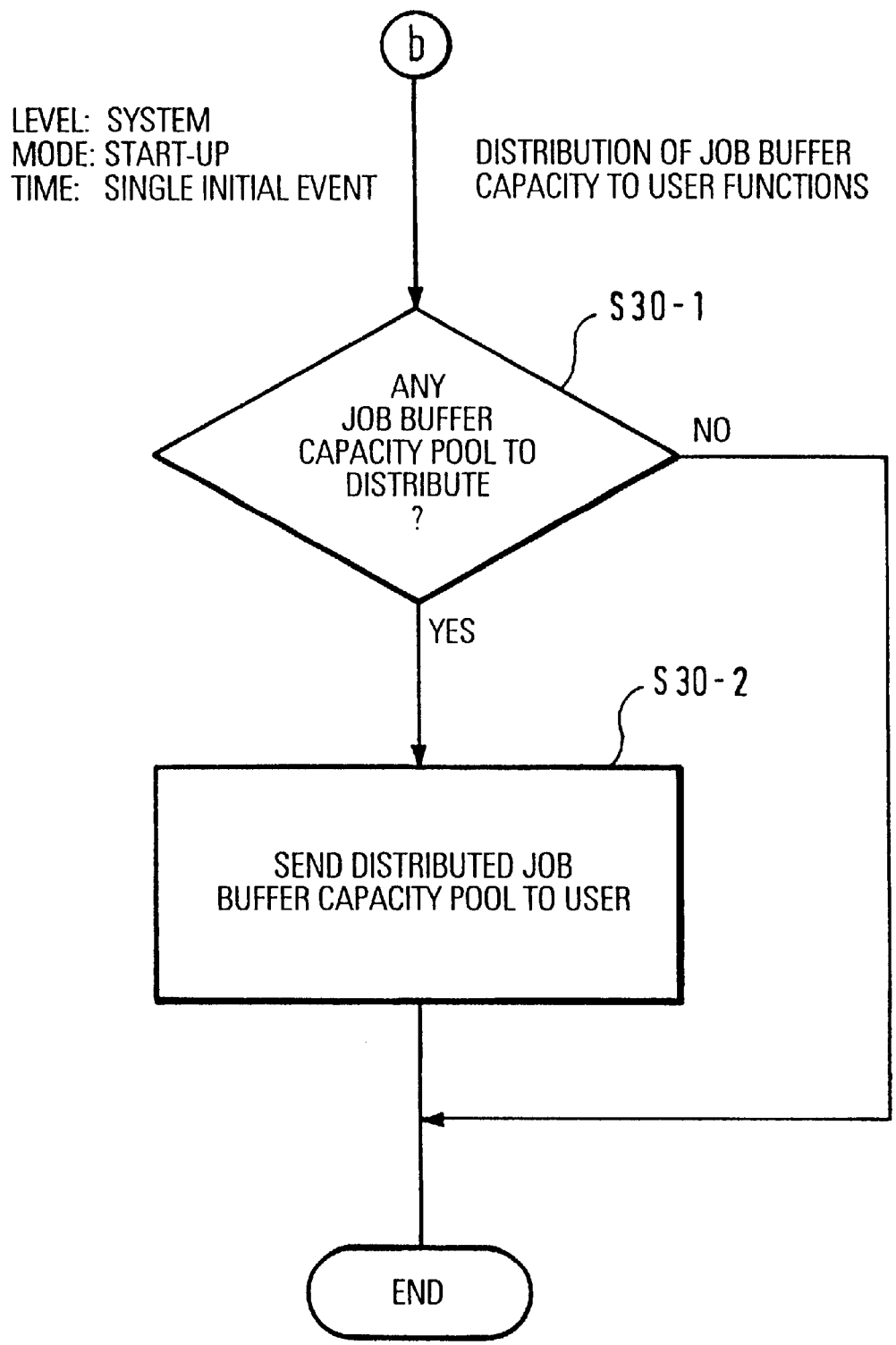
FIG. 30 shows the continuation of the calculation according to FIG. 29.

FIG. 30 shows the last step during system start-up, i.e. the distribution of job buffer capacity to different user functions and corresponds to a continuation of FIG. 29. Here, firstly, it is checked in step S30-1 whether any job buffer capacity pool is to be distributed and, secondly, if this is the case, the distributed job buffer capacity pool is sent to the corresponding user in step S30-2.

Further to the normal operation of the load regulation unit, to the initialization of a load regulation sub-interval and to the start-up outlined above, according to the present invention there is also provided an operating system detection of high job buffer load as explained in the following.

In particular, the operating system can detect hazardous growth of job buffer occupation immediately. The operating system will then call the load regulation unit to take immediate action, i.e. clear available job buffer capacity, clear job buffer capacity distributed to different users, and disable any new job request, respectively. Such requests could be related to all regulation functions, e.g., also to the seizure of processor load.

Figure 31:
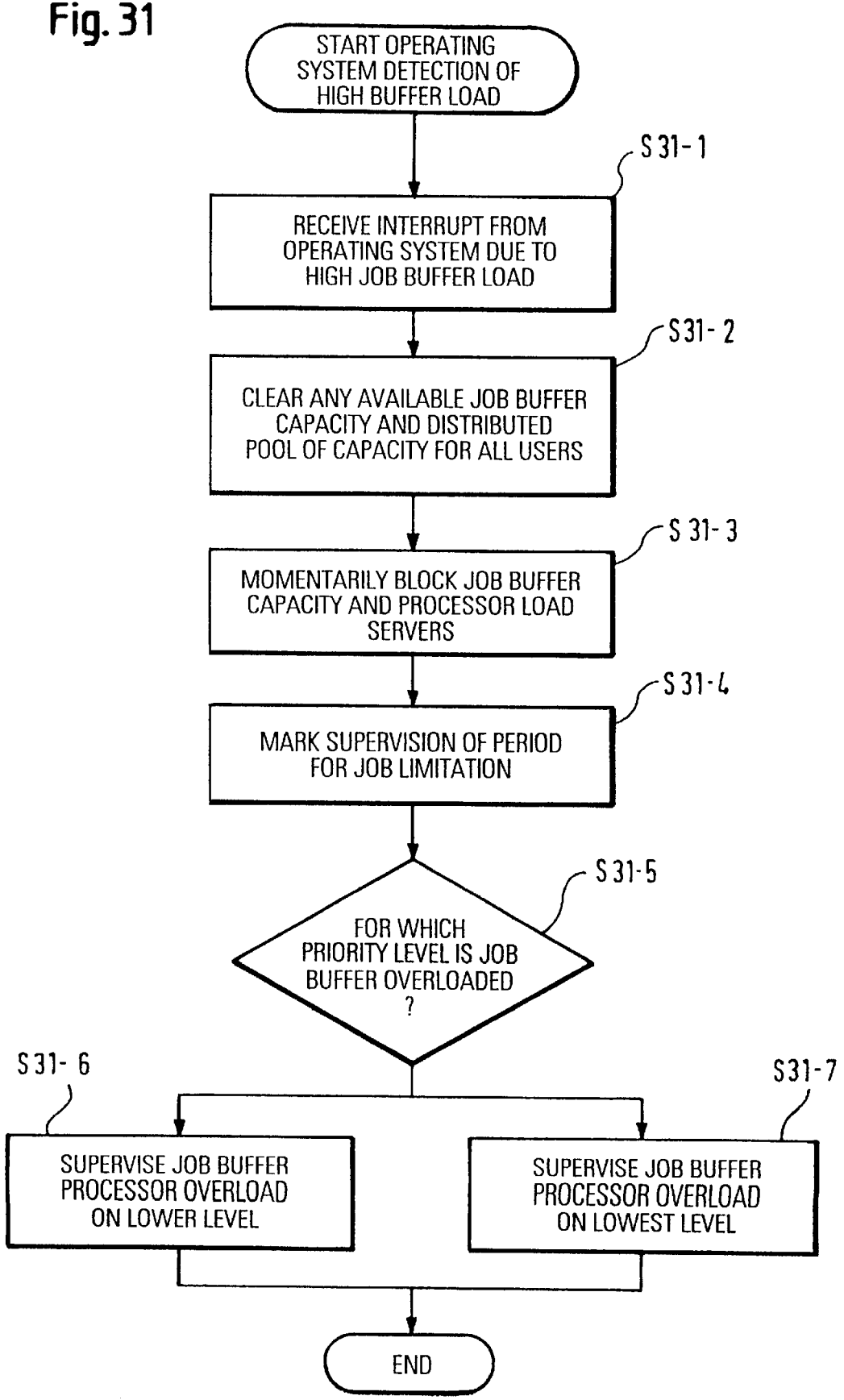
FIG. 31 shows the detection of a high buffer load on the operating system level.

FIG. 31 gives the steps necessary to carry out the operation system detection of high job buffer load. According to step 31-1 in case of a high job buffer load the load regulation unit 20 according to the present invention receives an interrupt from the operating system at any time during operation. Then, in step S31-2 any available job buffer capacity and any distributed pool of job buffer capacity for all users is cleared. Then, in step S31-3 the job buffer capacity and processor load seizures are momentarily blocked so as to reduce the high utilization of the job buffer capacity. A further measure is to start the supervision of job limitation in step S31-4. Then, in step S31-5 an interrogation takes place for which priority level the job buffer is actually overloaded. In steps S31-6 and S31-7 then the respective overload supervision is carried out on, e.g., at the C and D level, respectively.

Overall, this feature of the invention allows for an even more powerful and flexible control of the available job buffer capacity. Further, any system malfunctioning is avoided at the very beginning thus considerably facilitating recovering mechanisms.

Further, according to the present invention there is considered the fact that certain functions with high real-time demand may suffer if their request for job buffer capacity is queued in case no job buffer capacity is available. These functions may indicate that the request may not be queued but may be either acknowledged or rejected. It is also possible to override the available job buffer capacity depending on the load situation and on behalf of the subsequent regulation interval or intervals, respectively. This feature is possible due to the high safety margin within the job buffer capacity handling according to the present invention.

Also, while the present invention has generally been described with respect to any events that may occur in the central unit shown in FIG. 6, it may easily be used to regulate the flow of signals from regional processors to the central processor 22. Here, in case there exist a large number of regional processors, the regulation mechanism according to the present invention is not made with respect to job buffer load, but applied differently to protect against processor overload rather than buffer overload. One example would be that the regional processors may request for permission to continue with signalling to the central processor within regular intervals or renew a pool of signalling capacity. If the acknowledgement would be excessively delayed due to high load of the central processor 22, the regional processor RP would have to limit or stop sending signals. Therefore, the present invention allows to enable the central regulation function to effect the signalling from regional processors RP at extreme load situations.

Still further, the present invention can even be used to replace current regulation methods without the disadvantages of these methods but all advantages outlined above. One example would be to handle load allocation for different application modules within the central unit, which has been a problem with the state of the art.

Finally, the inventive functionality can of course be implemented in either application software or as operating system software or partly in both.

What is claimed is:

1. Load regulation method for a central unit in a real-time communication system, comprising the steps:
    a) submitting at least one job to a buffer means (18) providing a pre-specified buffer capacity for each of a plurality of job execution priority levels (A, B, C, D),
    b) submitting the jobs queued in the buffer means (18) to a processing means (22) for further processing according to the job execution priority level, respectively,
    c) interrupting a task on a lower job execution priority level in case a job on a higher job execution priority level is submitted to the buffer means (18),
    d) executing dynamic control of the load of the processing means (22) by
        d1) sending a loop signal to a lower priority level in case the seized job buffer capacity reaches the maximum available job buffer capacity on a higher priority level, and
        d2) resuming processing of jobs on the higher priority level in case an acknowledgement is received on this level after the processing of the loop signal on the lower priority level.

2. Load regulation method according to claim 1, characterized in that the available job buffer capacity is allowed to be filled up with requests queued on the higher priority level as soon as the processing is resumed on the higher priority level.

3. Load regulation method according to claim 1, characterized in that the load regulation method also comprises the regulation of processor overload in case the duration of job execution on higher priority levels is too long.

4. Load regulation method according to claim 1 or 2, characterized in that on each priority level the available job buffer capacity is dynamically updated according to the actually used job buffer capacity after each load regulation interval.

5. Load regulation method for a central unit in a real-time communication system, comprising the steps:
    a) submitting at least one job to a buffer means (18) providing a pre-specified buffer capacity,
    b) submitting the job queued in the buffer means (18) to a processing means (22) for further processing, and
    c) dynamically updating the available buffer capacity of the buffer means (18) according to the actually used job buffer capacity after each load regulation interval.

6. Load regulation method according to claim 5, characterized in that the load regulation method also comprises the regulation of processor overload in case the duration of job execution on higher priority levels is too long.

7. Load regulation method according to claim 6, characterized in that the load regulation of the processor and the load regulation of the job buffer (18) is achieved by receiving a loop signal on a lower or a lowest priority level (S25-1), then supervising the processor load until a cease of overload duration (S25-2), and finally continuing jobs on a higher priority level (S25-3).

8. Load regulation method according to claim 7, characterized in that the supervision of the processor load comprises the steps:
    a) reading the processor load for the last processor load supervision interval (S23-1),
    b) accumulating the read processor load to the previously accumulated processor load (S23-2),
    c) recalculating the load regulation parameters (S23-4), and
    d) executing supervision of processor load (S23-6) in case processor overload prevails for a pre-specified period of time (S23-5).

9. Load regulation method according to claim 8, characterized in that the step (S23-4) to recalculate load regulating parameters is adapted to adapt the message processing rate MPR according to $$MPR = A*(1-0,01)$$

where A is the average number of messages fetched during the last processor load regulation interval in case processor overload prevailed longer than a pre-specified period of time.

10. Load regulation method according to claim 8, characterized in that the step (S23-4) to recalculate the load regulating parameters is adapted to modify the message processing rate according to $$MPR = MPR + \text{Max}\left[1, \frac{(100-AL)*MPR}{660}\right] \quad (7)$$

where AL is the average load in case the average processor load is falling below a pre-specified lower processor load limit.

11. Load regulation method according to claim 9, characterized in that the step (S23-6) to supervise the processor load comprises the step to momentarily block job buffer and processor capacity requests (S24-5) in case processor overload duration is critical.

12. Load regulation method according to claim 11, characterized in that the processor load supervision interval is different from the load regulation interval pre-specified for the regulation of job buffer utilization.

13. Load regulation method for a central unit in a real-time communication system, comprising the steps:
    a) submitting at least one job to a buffer means (18) providing a pre-specified buffer capacity,
    b) submitting the job queued in the buffer means (18) to a processing means (22) for further processing, and
    c) dynamically updating the available buffer capacity of the buffer means (18) according to the actually used job buffer capacity after each load regulation interval.

14. Load regulation method according to claim 13, characterized in that there is provided a step (S18-4) to prepare each load regulation interval that comprises the sub-steps:
   a) supervision for limitation of jobs (S18-2),
   b) checking the load of the buffer means (S18-3),
   c) calculation of available job buffer capacity (S18-4),
   d) fetching any queued requests to the buffer means (S18-5), and
   e) fetching any queued processor load seizures (S18-6).

15. Load regulation method according to claim 14, characterized in that the step for the supervision of limitation of jobs (S18-2) further comprises the steps to set a counter for the evaluation of limitation period of jobs (S19-1) and stopping the supervision (S19-3) in case the period for limitation of jobs has ceased (S19-2).

16. Load regulation method according to claim 14, characterized in that the step (S18-3) to check the load of the buffers means comprises the sub-steps:
   a) checking the buffer means occupation (S20-1), and
   b) clearing the remaining job buffer capacity in case the load for any of the priority levels is too high (S20-1, S20-3) and sending the loop signal to a lower level after clearance of remaining job buffer capacity (S20-4, S20-5).

17. Load regulation method according to claim 14, characterized in that the step to check the load of the buffers means (S18-3) further comprises the step to clear distributed job buffer capacity for all users (S20-7) in case of a critical load (S20-6).

18. Load regulation method according to claim 14, characterized in that the step to calculate available job buffer capacity (S18-4) is executed according to Available capacity=(size used by functions with distributed capacity pool+size used by functions requesting job buffer capacity when needed−present buffer occupation)/(maximum size used by a single job).

19. Load regulation method according to claim 14, characterized in that the step of fetching any queued requests to buffer means (S18-5) comprises the sub-steps:
   a) checking whether any requests are put in a queue (S21-1) and fetching such requests (S21-2),
   b) comparing the job buffer capacity required for the fetched requests is lower than the available job buffer capacity (S21-3),
   c) acknowledging the fetched request and reducing the remaining job buffer capacity (S21-4) in case the interrogation in step b) is affirmative, and
   d) replacing the request in queue and clearing eventually remaining job buffer capacity (S21-6) in case the interrogation in step b) is negative.

20. Load regulation method according to claim 19, characterized in that the step to submit jobs to the buffer means (18) (step a, claims 1, 2) is sub-divided into the sub-steps:
   a) classification of the request type according to any available or all of requested (S11-1, S12-1),
   b) comparing the requested job buffer capacity to the available job buffer capacity (S11-2),
   c) acknowledging the requests (S11-3) and updating the job buffer capacity (S11-4) in case the interrogation in step b) is affirmative, and
   d) queuing the requests in a respective queue ($q_a$, $q_b$, $q_c$; S11-6) in case the interrogation in step b) is negative.

21. Load regulation method according to claim 20, characterized in that in step of acknowledging a request further comprises an interrogation step (S12-3) in case the request is of the all of requested type as to whether the requested job buffer capacity is lower or equal than the available job buffer capacity to queue the request (S12-5) if this is not the case.

22. Load regulation method according to claim 20, characterized in that the step of queuing a request further comprises the sub-steps of:
   a) checking whether the queue is full (S13-2),
   b) putting the request in queue in case enough queue capacity is available (S13-3), and
   c) rejecting the request in case not enough queue capacity is available (S13-4, 513-5).

23. Load regulation method according to claim 20, characterized in that there is further provided a step to fetch queued requests upon acknowledgement of a loop signal from a lower priority level (514-1, FIG. 16).

24. Load regulation method for a central unit in a real-time communication system, comprising the steps:
   a) submitting at least one job to a buffer means (18) providing a pre-specified buffer capacity for each of a plurality of job execution priority levels (A, B, C, D),
   b) submitting the jobs queued in the buffer means (18) to a processing means (22) for further processing according to the job execution priority level, respectively,
   c) interrupting a task on a lower job execution priority level in case a job on a higher job execution priority level is submitted to the buffer means (18),
   d) executing dynamic control of the load of the processing means (22) by
      d1) sending a loop signal to a lower priority level in case the seized job buffer capacity reaches the maximum available job buffer capacity on a higher priority level, and
      d2) resuming processing of jobs on the higher priority level in case an acknowledgement is received on this level after the processing of the loop signal on the lower priority level, wherein
   e) on each priority level the available job buffer capacity is dynamically updated according to the actually used job buffer capacity after each load regulation interval.

25. Load regulation method according to claim 24, characterized in that there is provided a step (S18-4) to prepare each load regulation interval that comprises the sub-steps:
   a) supervision for limitation of jobs (S18-2),
   b) checking the load of the buffer means (S18-3),
   c) calculation of available job buffer capacity (S18-4),
   d) fetching any queued requests to the buffer means (S18-5), and
   e) fetching any queued processor load seizures (S18-6).

26. Load regulation method according to claim 25, characterized in that the step for the supervision of limitation of jobs (S18-2) further comprises the steps to set a counter for the evaluation of limitation period of jobs (S19-1) and stopping the supervision (S19-3) in case the period for limitation of jobs has ceased (S19-2).

27. Load regulation method according to claim 25, characterized in that the step (S18-3) to check the load of the buffers means comprises the sub-steps:
   a) checking the buffer means occupation (S20-1), and
   b) clearing the remaining job buffer capacity in case the load for any of the priority levels is too high (S20-1, S20-3) and sending the loop signal to a lower level after clearance of remaining job buffer capacity (S20-4, S20-5).

28. Load regulation method according to claim 25, characterized in that the step to check the load of the buffers means (S18-3) further comprises the step to clear distributed job buffer capacity for all users (S20-7) in case of a critical load (S20-6).

29. Load regulation method according to claim 25, characterized in that the step to calculate available job buffer capacity (S18-4) is executed according to Available capacity=(size used by functions with distributed capacity pool+size used by functions requesting job buffer capacity when needed−present buffer occupation)/(maximum size used by a single job).

30. Load regulation method according to claim 25, characterized in that the step of fetching any queued requests to buffer means (S18-5) comprises the sub-steps:
a) checking whether any requests are put in a queue (S21-1) and fetching such requests (S21-2),
b) comparing the job buffer capacity required for the fetched requests is lower than the available job buffer capacity (S21-3),
c) acknowledging the fetched request and reducing the remaining job buffer capacity (S21-4) in case the interrogation in step b) is affirmative, and
d) replacing the request in queue and clearing eventually remaining job buffer capacity (S21-6) in case the interrogation in step b) is negative.

31. Load regulation method according to claim 30, characterized in that the step to submit jobs to the buffer means (18) (step a, claims 1, 2) is sub-divided into the sub-steps:
a) classification of the request type according to any available or all of requested (S11-1, S12-1),
b) comparing the requested job buffer capacity to the available job buffer capacity (S11-2),
c) acknowledging the requests (S11-3) and updating the job buffer capacity (S11-4) in case the interrogation in step b) is affirmative, and
d) queuing the requests in a respective queue ($q_a$, $q_b$, $q_c$; S11-6) in case the interrogation in step b) is negative.

32. Load regulation method according to claim 31, characterized in that in step of acknowledging a request further comprises an interrogation step (S12-3) in case the request is of the all of requested type as to whether the requested job buffer capacity is lower or equal than the available job buffer capacity to queue the request (S12-5) if this is not the case.

33. Load regulation method according to claim 31, characterized in that the step of queuing a request further comprises the sub-steps of:
a) checking whether the queue is full (S13-2),
b) putting the request in queue in case enough queue capacity is available (S13-3), and
c) rejecting the request in case not enough queue capacity is available (S13-4, S13-5).

34. Load regulation method according to claim 31, characterized in that there is further provided a step to fetch queued requests upon acknowledgement of a loop signal from a lower priority level (S14-1, FIG. 16).

35. Load regulation method for a central unit in a real-time communication system, comprising the steps:
a) submitting at least one job to a buffer means (18) providing a pre-specified buffer capacity for each of a plurality of job execution priority levels (A, B, C, D),
b) submitting the jobs queued in the buffer means (18) to a processing means (22) for further processing according to the job execution priority level, respectively,
c) interrupting a task on a lower job execution priority level in case a job on a higher job execution priority level is submitted to the buffer means (18),
d) executing dynamic control of the load of the processing means (22) by
d1) sending a loop signal to a lower priority level in case the seized job buffer capacity reaches the maximum available job buffer capacity on a higher priority level, and
d2) resuming processing of jobs on the higher priority level in case an acknowledgement is received on this level after the processing of the loop signal on the lower priority level, wherein
e) a loop signal is sent to a lower level (FIG. 16) in case not enough job buffer capacity is left (S11-5) or a request is queued (S11-6).

36. Load regulation method according to claim 35, characterized in that there is further provided a step to fetch queued requests upon acknowledgement of a loop signal from a lower priority level (S14-1, FIG. 16).

37. Load regulation method according to claim 36, characterized in that the step to fetch queued requests (S14-3) further comprises a
a) step to compare the job buffer capacity with the available job buffer capacity (S15-3) upon fetching of the requested job,
b) acknowledging the requested job in case enough job buffer capacity is available (S15-6), and
c) placing the requested job again in the queue (S15-4) in case the requested job buffer capacity is larger than the available job buffer capacity.

38. Load regulation method according to claim 37, characterized in that at the start-up of the real-time communication system a user report on the use of the job buffer capacity is received (S27-1) and then the user report is either stored as being of the normal type (S27-3) or of the distributed type (S27-4), respectively.

39. Load regulation method according to claim 38, characterized in that at the start-up of the real-time communication system job buffer pools are calculated on the basis of user subscription data (S28-2).

40. Load regulation method according to claim 39, characterized in that there is also provided a step (S31-1) to receive an operating system interrupt in case of high job buffer load.

41. Load regulation method according to claim 40, characterized in that in case an interrupt is received from the operating system the available job buffer capacity and processor load seizures are blocked momentarily (S31-3) and a supervision period for job limitation is started (S31-4).

42. Load regulation unit for a real-time communication system, comprising:
a) buffer means (18) providing buffer capacity for jobs to be processed in the real-time communication system,
b) processing means (22) handling the jobs submitted to the buffer means (18), and
c) load regulation means (20, 26) adapted to dynamically adjust the available buffer capacity of the buffer means (18) in dependence on the actually seized job buffer capacity at the start of every load regulation interval.

43. Load regulation unit according to claim 42, characterized in that it further comprises a central processor overload means (28) to supervise the load condition of the processing means (22) to make optimal use of processing capacity.

44. Load regulation unit according to claim 42, characterized in that it further comprises a start-up unit (30) to control the real-time communication system during the start-up of operation.

45. Load regulation unit according to claim 42, characterized in that a queue means ($q_a$, $q_b$, $q_c$) is provided for each job execution priority level (A, B, C).

46. Load regulation unit according to claim 42, characterized in that the buffer means (18) is adapted to provide a job buffer capacity pool (a-1, a-2, b-1, c-1, c-2) for each of a plurality of user functions.

47. Load regulation unit for a real-time communication system, comprising:
   a) buffer means (18) providing buffer capacity for each of a plurality of job execution priority levels (A, B, C, D),
   b) processing means (22) handling the jobs submitted to the buffer means (18), and
   c) load regulation means (20, 26) adapted to
      c1) submit a job to the buffer means (18) according to the respective job execution priority level and the available buffer capacity assigned to the job execution priority level,
      c2) to send a loop signal to a lower priority level in case the seized buffer capacity in the buffer means (18) reaches the maximum available buffer capacity on the higher priority level, and
      c3) to resume the processing of jobs on the higher priority level in case on processing of the loop signal on the lower priority level an acknowledgement is sent up to the higher priority level.

48. Load regulation unit according to claim 47, characterized in that it further comprises a central processor overload means (28) to supervise the load condition of the processing means (22) to make optimal use of processing capacity.

49. Load regulation unit according to claim 47, characterized in that it further comprises a start-up unit (30) to control the real-time communication system during the start-up of operation.

50. Load regulation unit according to claim 47, characterized in that a queue means ($q_a$, $q_b$, $q_c$) is provided for each job execution priority level (A, B, C).

51. Load regulation unit according to claim 47, characterized in that the buffer means (18) is adapted to provide a job buffer capacity pool (a-1, a-2, b-1, c-1, c-2) for each of a plurality of user functions.

* * * * *